US012669397B2

(12) United States Patent
Conley et al.

(10) Patent No.: US 12,669,397 B2
(45) Date of Patent: Jun. 30, 2026

---

(54) MODULAR SENSOR FUSION PLATFORM FOR HYDROCARBON STORAGE EQUIPMENT MONITORING

(71) Applicant: Clean Connect AI Inc., Windsor, CO (US)

(72) Inventors: David A. Conley, Windsor, CO (US); Luke Coats, Fort Collins, CO (US); Remington Engelhard, Berthoud, CO (US); Jaren Samples, Windsor, CO (US)

(73) Assignee: Clean Connect AI Inc., Windsor, CO (US)

( * ) Notice: Subject to any disclaimer, the term of this patent is extended or adjusted under 35 U.S.C. 154(b) by 0 days.

(21) Appl. No.: 18/805,809

(22) Filed: Aug. 15, 2024

(65) Prior Publication Data

US 2025/0067616 A1     Feb. 27, 2025

Related U.S. Application Data

(60) Provisional application No. 63/578,309, filed on Aug. 23, 2023.

(51) Int. Cl.
G01M 3/16          (2006.01)
G01F 23/00         (2022.01)
(Continued)

(52) U.S. Cl.
CPC ........... G01M 3/16 (2013.01); G01F 23/0007 (2013.01); G06V 10/803 (2022.01); G06V 20/52 (2022.01); H04N 23/23 (2023.01); H04N 23/695 (2023.01)

(58) Field of Classification Search
CPC .......... G01M 3/16; G01M 3/002; G01M 3/38; G01F 23/0007; G06V 10/803;
(Continued)

(56) References Cited

U.S. PATENT DOCUMENTS 11,249,182 B2 * 2/2022 Luders .................... G01S 17/04
11,674,839 B1 * 6/2023 Spears .................. G01F 23/292
                                                            348/164
(Continued)

FOREIGN PATENT DOCUMENTS

WO     WO-2023028337 A1 * 3/2023 ............. E21B 44/00

OTHER PUBLICATIONS

International Search Report & Written Opinion for PCT Application No. PCT/US2024/043640, mailed Dec. 9, 2024; 11 pages.

*Primary Examiner* — Adnan Aziz

(57) ABSTRACT

Various embodiments of the present technology relate to solutions for hydrocarbon equipment monitoring. In some examples, a detection system comprises a compute engine, a gimbal, a sensor suite, and an imaging system. The compute engine generates signaling that directs the gimbal to orient the imaging system, signaling that directs the imaging system to image the equipment, and signaling that directs the sensor suite to sense the equipment. The gimbal orients the imaging system based on the signaling. The imaging system images the equipment and transfers images depicting the storage equipment to the compute engine. The sensor suite senses the equipment and transfers sensor data that characterizes the equipment to the compute engine. The compute engine processes the data with a machine learning engine trained to determine the status of the equipment. The compute engine transfers a machine learning output that indicates the status to a downstream system.

20 Claims, 19 Drawing Sheets

200 —

(51) Int. Cl.
    *G06V 10/80*       (2022.01)
    *G06V 20/52*       (2022.01)
    *H04N 23/23*       (2023.01)
    *H04N 23/695*     (2023.01)

(58) Field of Classification Search
    CPC .... G06V 20/52; G06V 10/147; G03B 17/561;
              H04N 23/23; H04N 23/695; H04N 23/13;
              H04N 23/57; H04N 7/188; E21B 43/2607
    See application file for complete search history.

(56)              References Cited

U.S. PATENT DOCUMENTS

| | | | |
|---|---|---|---|
| 2017/0227457 A1* | 8/2017 | Zakrzewski | G01F 23/804 |
| 2019/0180464 A1* | 6/2019 | Kraft | G01F 22/00 |
| 2019/0303648 A1* | 10/2019 | Zhai | G06V 10/764 |
| 2021/0025383 A1* | 1/2021 | Bodishbaugh | F04B 15/02 |
| 2021/0350162 A1 | 11/2021 | Miller et al. | |
| 2022/0381639 A1 | 12/2022 | Kester et al. | |
| 2023/0041357 A1 | 2/2023 | Saika et al. | |
| 2023/0119975 A1* | 4/2023 | Diehl | G01S 17/87 |
| | | | 701/28 |
| 2023/0337606 A1* | 10/2023 | Borhani | A01G 27/003 |

* cited by examiner

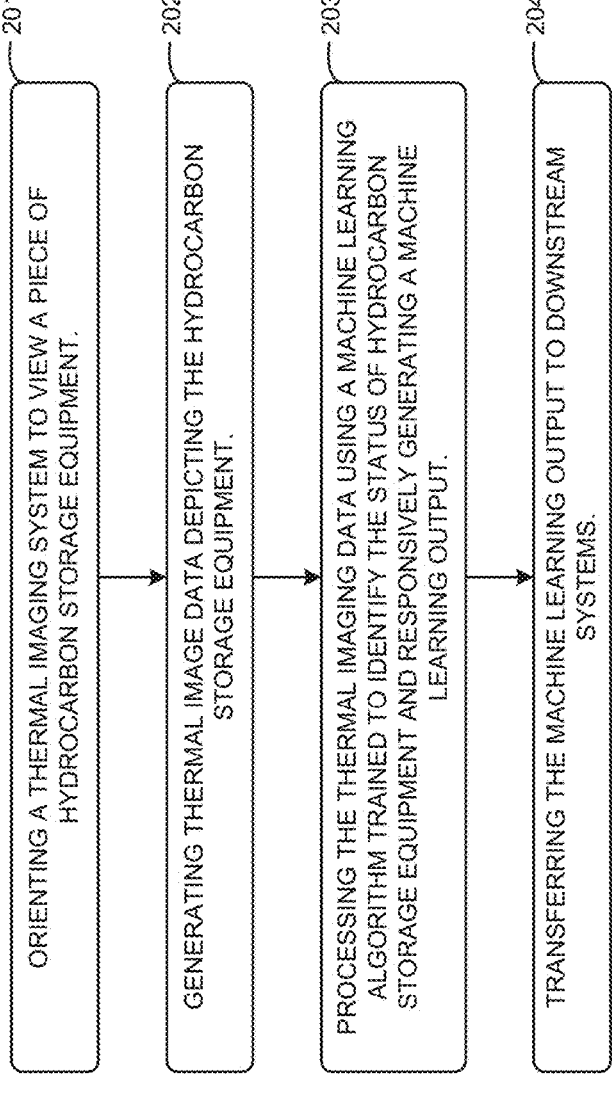

201

ORIENTING A THERMAL IMAGING SYSTEM TO VIEW A PIECE OF HYDROCARBON STORAGE EQUIPMENT.

202

GENERATING THERMAL IMAGE DATA DEPICTING THE HYDROCARBON STORAGE EQUIPMENT.

203

PROCESSING THE THERMAL IMAGING DATA USING A MACHINE LEARNING ALGORITHM TRAINED TO IDENTIFY THE STATUS OF HYDROCARBON STORAGE EQUIPMENT AND RESPONSIVELY GENERATING A MACHINE LEARNING OUTPUT.

204

TRANSFERRING THE MACHINE LEARNING OUTPUT TO DOWNSTREAM SYSTEMS.

MOUNTING STRUCTURE 531

SENSOR FACEPLATE 513

SENSORS 514

MOUNTING SOCKET 512

HOUSING 511

GIMBAL ARM 515

CAMERA 524

500

MOUNTING
SOCKET 512

HOUSING
511

SENSOR
FACEPLATE
513

MOUNTING
SOCKET 512

HOUSING
511

SENSORS
514

SENSOR
FACEPLATE
513

GIMBAL ARM
MOUNT 516

SENSOR
FUSION

500

WIRING
518

GIMBAL
ARM 515

CAMERA
MOUNT 517

500

WIRING 518

CAMERA MOUNT 517

GIMBAL ARM 515

500

HOUSING 511

GIMBAL 519

SENSOR FACEPLATE 513

COMPUTE ENGINE 520

500

GIMBAL 519

SENSOR FACEPLATE 513

HOUSING 511

AIR INLET 521

COMPUTE ENGINE 520

GIMBAL ARM MOUNT 516

500

SENSOR FACEPLATE 513

HOUSING 511

AIR FILTERS 523

AIR OUTLET 522

GIMBAL ARM MOUNT 516

COMPUTE ENGINE 520

500

CAMERA
524

500

MOUNTING
STRUCTURE
531

MODULAR SENSOR FUSION PLATFORM FOR HYDROCARBON STORAGE EQUIPMENT MONITORING

CROSS-REFERENCE TO RELATED APPLICATIONS

This U.S. Patent Applications claims priority to U.S. Provisional Patent Application 63/578,309 titled "MODULAR SENSOR FUSION PLATFORM FOR HYDROCARBON STORAGE EQUIPMENT MONITORING" which was filed on Aug. 23, 2023. U.S. Provisional Patent Application 63/578,309 is incorporated into this U.S. Patent Applications in its entirety.

TECHNICAL FIELD

Various embodiments of the present technology relate to hydrocarbon technologies, and more specifically, to detecting and monitoring hydrocarbon storage, transfer, and extraction equipment.

BACKGROUND

Hydrocarbon extraction systems comprise machinery and equipment configured to extract petroleum, natural gas, and other types of chemicals for use in energy generation, heating, and chemical production applications. Hydrocarbon extraction systems comprise extraction equipment, transfer equipment, and storage equipment. The extraction equipment removes hydrocarbons from subterranean reservoirs. Examples of extraction equipment include drilling rigs and hydraulic fracturing devices. The transfer equipment transports the extracted hydrocarbons between different geographic locations. Examples of transfer equipment include pipelines and tanker trucks. The storage equipment stores the hydrocarbons. Examples of storage equipment include bullet tanks and storage vessels. Operators often need to survey the hydrocarbons extraction equipment, storage equipment, and transfer equipment.

Conventional methods to monitor hydrocarbon extraction, storage, and transfer equipment use surveillance cameras and on-site human operators to track the status of the equipment. The surveillance cameras are mounted at elevation and positioned to view the equipment of interest. The cameras generate video depicting the equipment and transfer the video to a centralized monitoring station. There, human operators review the video footage to identify the status of the equipment. Hydrocarbon extraction and storage equipment are often located in harsh environments. In these harsh environments, the co-located surveillance cameras are exposed to extreme temperature, wind, dust, precipitation, and the like which degrade the performance of the surveillance cameras over time. Furthermore, surveillance cameras typically only image the hydrocarbon equipment in one modality (e.g., in the visible spectrum or in the infrared spectrum). The imaging modalities are typically hardwired which inhibits the swapping or addition of other imaging modalities.

Unfortunately, conventional surveillance systems do not effectively or efficiently monitor hydrocarbon equipment. These surveillance systems do not effectively withstand harsh environmental conditions. Moreover, these surveillance systems often lack multi-modal imaging which limits their detection capabilities.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for hydrocarbon equipment monitoring. Some embodiments comprise a detection system to monitor a hydrocarbon storage environment. The detection system comprises a compute engine, a gimbal, a sensor suite, and an imaging system. The gimbal is communicatively coupled to the compute engine. The sensor suite is communicatively coupled to the compute engine. The imaging system is communicatively coupled to the compute engine and operatively coupled to the gimbal. The compute engine receives a command to view a piece of hydrocarbon storage equipment. The compute engine generates control signaling that directs the gimbal to orient the imaging system and transfers the control signaling to the gimbal. The compute engine generates image signaling that directs the imaging system to image the hydrocarbon storage equipment and transfers the image signaling to the imaging system. The compute engine generates sensor signaling that directs the sensor suite to sense the hydrocarbon storage equipment and transfers the sensor signaling to the sensor suite. The gimbal receives the control signaling and orients the imaging system based on the control signaling. The imaging system receives the image signaling, images the hydrocarbon storage equipment, and transfers image data that depicts the hydrocarbon storage equipment to the compute engine. The sensor suite receives the sensor signaling, senses the hydrocarbon storage equipment, and transfers sensor data that characterizes the hydrocarbon storage equipment to the compute engine. The compute engine receives the image data and the sensor data. The compute engine processes the image data and the sensor data with a machine learning algorithm trained to determine the status of the hydrocarbon storage equipment. The computer engine transfers a machine learning output that indicates the status of the hydrocarbon storage equipment to a downstream system.

Some embodiments comprise a method of operating a detection system to monitor a hydrocarbon storage environment. The method comprises orienting a thermal imaging system to view a piece of hydrocarbon storage equipment. The method further comprises generating thermal image data depicting the hydrocarbon storage equipment. The method further comprises processing the thermal imaging data using a machine learning algorithm trained to identify the status of the hydrocarbon storage equipment and responsively generating a machine learning output. The method further comprises transferring the machine learning output to downstream systems.

Some embodiments comprise a non-transitory computer-readable medium stored thereon instructions to monitor a hydrocarbon storage environment. The instructions, in response to execution, cause a system comprising a processor to perform operations. The operations comprise orienting a thermal imaging system to view a piece of hydrocarbon storage equipment. The operations further comprise generating thermal image data depicting the hydrocarbon storage equipment. The operations further comprise processing the thermal imaging data using a machine learning algorithm trained to identify the status of the hydrocarbon storage equipment and responsively generating a machine learning output. The operations further comprise transferring the machine learning output to downstream systems.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 2 illustrates an exemplary operation of the hydrocarbon extraction and storage environment.

FIG. 11 illustrates an exemplary computing system.

Figure 1:
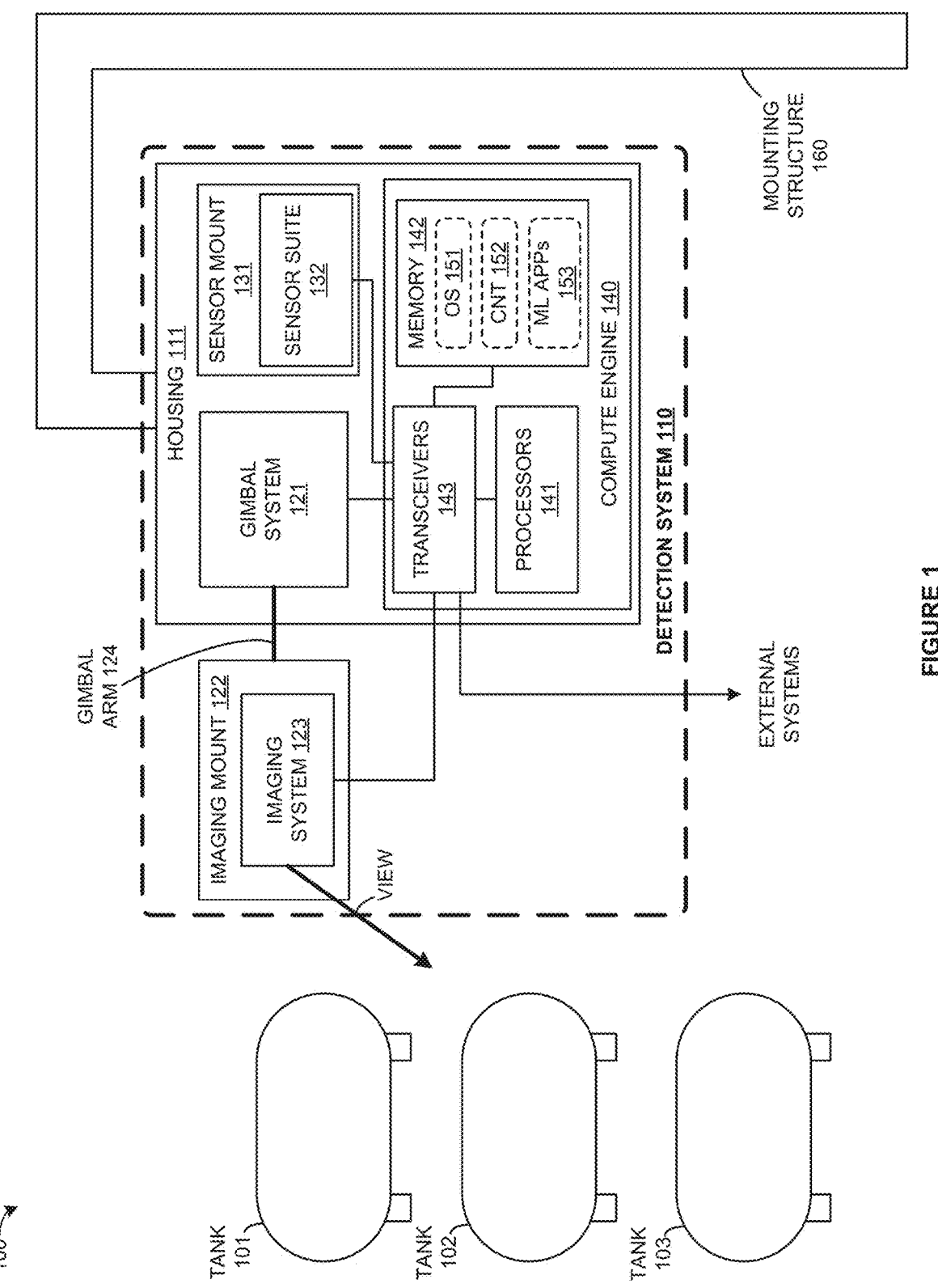
FIG. 1 illustrates an exemplary hydrocarbon extraction and storage environment.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates hydrocarbon extraction and storage environment 100 to monitor hydrocarbon storage, transfer, and extraction equipment. Environment 100 performs services like services like hydrocarbon storage, hydrocarbon transfer, hydrocarbon extraction, hydrocarbon equipment leak detection, hydrocarbon equipment fill level detection, and operator alerting and notification. Environment 100 comprises storage tanks 101-103, detection system 110, and mounting structure 160. Detection system 110 comprises housing 111, gimbal system 121, imaging mount 122, imaging system 123, sensor mount 131, sensor suit 132, and compute engine 140. Compute engine 140 comprises processors 141, memory 142, and transceivers 143. Memory 142 stores operation system (OS) 151, control (CNT) application 152, and machine learning (ML) applications (APPs) 153. In other examples, environment 100 may include fewer or additional components than those illustrated in FIG. 1. Likewise, the illustrated components of environment 100 may include fewer or additional components, assets, or connections than shown. Compute engine 140 may be representative of a single computing apparatus or multiple computing apparatuses.

Storage tanks 101-103 are representative of hydrocarbon storage devices. Exemplary fuel storage equipment includes bullet tanks, Liquified Natural Gas (LNG) storage tanks, gas-holders, petroleum storage tanks, petroleum storage vehicles, and/or other types of petrochemical storage systems. In some examples, environment 100 may comprise additional devices for fuel extraction and fuel transfer. For example, environment 100 may comprise hydraulic fracturing equipment, oil drilling equipment, pipeline equipment, filling pumps, tanker vehicles, and the like. Storage tanks 101-103 may store any type of hydrocarbon. For example, tanks 101-103 may store natural gas, petroleum, refined petroleum products, petrochemicals, and the like.

Detection system 110 is representative of an apparatus to monitor tanks 101-103. Detection system 110 may detect fuel leaks tanks 101-103, measure the fill level of tanks 101-103, or perform some other type of monitoring operation. Detection system 110 is mounted at elevation on camera mounting structure 160. Although mounting structure 160 is depicted as a pole, mounting structure 160 may comprise a different type of mounting structure or detection system 110 may use no mounting structure at all. Housing 111 may be detachable coupled to mounting structure 160. For example, housing 111 may comprise quick connect sockets, a male/female screw connection, or some other type of detachable coupling mechanism. Alternatively, housing 111 may be permanently coupled to structure 160 (e.g., by a weld).

Imaging system 123 generates videos depicting tanks 101-103. In this example, imaging system 123 generates infrared and/or optical video images depicting tanks 101-103, however in other examples, imaging system 123 may employ a different type of imaging technology. For example, imaging system 123 may instead comprise an ultraviolet imaging system. Imaging system 123 transfers the resulting images depicting tanks 101-103 to compute engine 140. Imaging system 123 may comprise a single imaging device or multiple imaging devices. The multiple imaging devices may include a combination of optical, infrared, and/or laser cameras and imaging devices to monitor tanks 101-103. Imaging system 123 is mounted to imaging mount 122. Mount 122 is operatively coupled to gimbal 121 in housing 111 via gimbal arm 124. Imaging system 123 (and/or mount 122) may be detachably coupled to housing 111. For example, imaging system 123 may comprise a quick connect socket (or some other type of detachable coupling mechanism) that snap connects to mount 122. As illustrated in FIG. 1, imaging system 123 is mounted external to housing 111 while gimbal system 121, sensor suite 132, and compute engine 140 are mounted internally in housing 111.

Sensor suite 132 is coupled to housing 111 via sensor mount 131 and comprises a set of sensors to monitor tanks 101-103 in addition to the imaging by system 123. For example, sensor suite 132 may comprise laser rangefinders to estimate the distance between tanks 101-103 and detection system 110. Sensor suite 132 may comprise imaging devices that comprise a different modality than imaging system 132. For example, imaging system 123 may comprise an infrared camera while sensor suite 132 may comprise a visible spectrum camera. By utilizing multiple types of imaging modalities in system 123 and suite 132, detection system 110 may generate multi-layered videos depicting tanks 101-103. Sensor suite 132 may comprise additional environmental sensing devices to measure and report environmental conditions like temperature, pressure, geolocation, wind speed, wind direction, cloud cover, visibility, humidity, dew point and/or other types of sensor data. Exemplary environmental sensor devices include thermometers, pressure gauges, Global Positioning System (GPS) devices, and the like. Sensor suite 132 generates and reports sensor data characterizing tanks 101-103 to compute engine 140. Sensor suite 132 may be detachably coupled to housing 111. For example, housing 111 may comprise a quick connect socket that allows sensor mount 131 to snap connect into housing 111. The detachable coupling enhances the modularity of detection system 110. For example, operators may use the detachable quick connects to change out imaging system 123 and sensor suite 132 for different types of cameras and sensor packages.

Gimbal system 121 is representative of a pan and tilt system that orients imaging system 123 to view tanks 101-103 and stabilizes the field of view. Gimbal 121 comprises actuators and rotors to control the pitch, roll, and yaw of imaging system 123. For example, control application 152 may generate control signaling that drives gimbal 121 to move gimbal arm 124 to orient imaging system 123 to pre-defined views and control the direction of imaging system 123 to provide a 360-degree field of view with imaging system 123. Gimbal 121 may receive the instructions (e.g., from compute engine 140) and responsively position imaging system 123 to view tanks 101-103. Gimbal 121 may implement a control loop to stabilize the field of view of imaging system 123. For example, mounting structure 160 may sway in windy conditions. Control application 152 may interface with gimbal 121 to update the pitch, roll, and yaw of imaging system 123 to account for the sway of mounting structure 160. By updating the position of imaging system 123 in response to environmental disturbances, detection system 110 provides a stable and consistent image/video feed of tanks 101-103. Exemplary control loops include feedback loops, Proportional-Integral-Derivative (PID) control loops and the like.

Compute engine 140 is representative of one or more computing devices configured to receive image data from imaging system 123 and sensor data from sensor suite 132 to monitor the status of tanks 101-103. Compute engine 140 comprises processors 141, memory 142, and transceivers 143. Memory 142 stores operating system 151, control application 152, and machine learning application 153. Processors 141 retrieve and execute the software stored by memory 142 to monitor tanks 101-103, control the operations of gimbal system 121, imaging system 123, and sensor suite 132, and/or otherwise drive the operation of detection system 110. Processors 141 communicates with gimbal 121, imaging system 123, sensor suite 132, and external systems via transceivers 143. Compute engine 140 hosts one or more machine learning models (represented as machine learning applications 153). For example, compute engine 140 may comprise an application specific circuit configured to implement a machine learning model. Compute engine 140 may additionally host interfacing applications to receive and preprocess the image and sensor data from imaging system 123 and sensor suite 132. The interfacing applications may vectorize the received data to configure the data for ingestion by machine learning applications 153. Vectorization is a feature extraction process to numerically represent the received data. For example, processors 141 may generate feature vectors that numerically represent individual pixels of the image data received from imaging system 123.

Operating system 151 is representative of the system software for detection system 110 to manage the hardware and software resources. Control application 152 is representative of the control software to manage the operation of gimbal 121, imaging system 123, and sensor suite 132. For example, processors 141 may execute control application 152 and control application 152 may generate instructions that drive system 123 to record tanks 101-103, drive sensor suite 132 to sense tanks 101-103, and drive gimbal 121 to orient imaging system 123 to achieve a desired field of view. Machine learning applications 153 comprises any machine learning models implemented within environment 100 as described herein to monitor tanks 101-103, including operations to detect the presence of gas leaks from tanks 101-103 and to measure fill levels in tanks 101-103. A machine learning model comprises one or more machine learning algorithms that are trained based on historical data and/or other types of training data. A machine learning model may employ one or more machine learning algorithms through which data can be analyzed to identify patterns, make decisions, make predictions, or similarly produce output that can identify the presence of status (e.g., presence of a gas leak) of hydrocarbon storage, transfer, and extraction equipment in environment 100. Machine learning applications 153 may comprise algorithms to detect background environments, to detect motion, to detect equipment, to classify gas leaks, to detect fill levels, to screen for false positive outputs, and/or other types of machine learning algorithms. Examples of machine learning algorithms that may be employed solely or in conjunction with one another include Three Dimensional (3D) deep leaning models, 3D convolutional neural networks, times series convolutional deep learning, transformers, multi-layer perceptron, long term short memory, and attention based deep learning model. Other exemplary machine learning algorithms include artificial neural networks, nearest neighbor methods, ensemble random forests, support vector machines, naïve Bayes methods, linear regressions, or similar machine learning techniques or combinations thereof capable of predicting output based on input data.

In some examples, machine learning applications 153 may be trained to detect gas leaks using videos generated by imaging system 123. For example, imaging system 123 may transfer the training video images to an external computing system. A user may then annotate image frames of the video to create a training data set. The user may also combine environment and equipment information in the training data set. The annotations classify or segment portions of the images. For example, the annotations may classify a portion of the images as storage tanks 101-103, another portion of the images as a gas leak, and another portion of the images as background environment. The external computing system transfers the training data to compute engine 140 to train machine learning applications 153 to monitor the status of tanks 101, to detect gas leaks emanating from tanks 101-103, and/or to perform some type of hydrocarbon equipment monitoring operation. Compute engine 140 receives and vectorizes the training data. Machine learning applications 153 ingest the training data and train their constituent machine learning algorithms to monitor the status of tanks 101-103, to detect gas leaks from tanks 101-103, and/or to perform some type of hydrocarbon equipment monitoring operation.

In some examples, machine learning applications 153 are trained to determine the fill level in tanks 101-103 using thermal image data generated by imaging system 123. For example, imaging system 123 may transfer the training images to the external computing system. A user may then annotate the images to create a training data set. For example, the annotations may classify a portion of the images as storage tank 101, another portion of the images as background environment, and another portion of the image as the fill level in tanks 101-103. The external computing system transfers the training data to compute engine 140 to train machine learning application 153. Compute engine 140 receives and vectorizes the training data. Machine learning application 153 ingests the training data and trains its constituent machine learning algorithms to monitor the status of tanks 101-103, to measure tank fill levels, and/or to perform some type of hydrocarbon equipment monitoring operation.

It should be understood that natural gas leaks and are difficult to view in the visual light spectrum. As such, imaging system 123 typically comprises imaging technology for generating images in non-visible spectrums (e.g., infrared) when machine learning applications 153 are trained to detect gas leaks. It should be understood that fuel storage tanks typically have opaque walls that obstruct the interior view of the tank. As such, camera 111 typically comprises imaging technology for generating images in non-visible spectrums (e.g., infrared) when machine learning applications 153 are trained to detect tank fill levels.

In some examples, environment 100 comprises a user computer (not illustrated) to facilitate interaction between operators and detection system 110. The user computer may be representative of one or more computing devices configured to host a user application and display a Graphical User Interface (GUI). The user computer may comprise one or more computing devices, display screens, touch screen devices, tablet devices, mobile user equipment, keyboards, and the like. The user computer may be communicatively coupled to compute engine 140 over transceivers 143. The user computer may be deployed at a remote location or on premises in environment 100 (e.g., proximate to tanks 101-103). The user application may display footage of tanks 101-103, machine learning outputs generated by applications 153, gas leak footage, gas leak metrics, tank fill footage, tank fill metrics, and/or other visual/textual elements supplied by detection system 110 that characterize the status of tanks 101-103. The user computer may send some or all of the machine learning outputs model results to a cloud computing system to distribute the leak indication results for other use cases including reporting, saving historical data, presentation, and/or combining with different models or databases.

Gimbal system 121, imaging system 123, sensor suite 132, and compute engine 140 communicate over various communication links using communication technologies like Institute of Electrical and Electronic Engineers (IEEE) 802.3 (Ethernet), IEEE 802.11 (WiFi), Fifth Generation New Radio (5GNR), Long-Term Evolution (LTE), Bluetooth, Time Division Multiplex (TDM), Data Over Cable System Interface Specification (DOCSIS), Internet Protocol (IP), General Packet Radio Service Transfer Protocol (GTP), and/or some other type of wireline and/or wireless networking protocol. The communication links comprise metallic links, glass fibers, radio channels, or some other communication media. The links use Ethernet, WiFi, virtual switching, inter-processor communication, bus interfaces, and/or some other data communication protocols.

Gimbal system 121, imaging system 123, sensor suite 132, and compute engine 140 comprise microprocessors, software, memories, transceivers, bus circuitry, and the like. The microprocessors comprise Central Processing Units (CPUs), Graphical Processing Units (GPUs), Vision Processing Units (VPUs), Digital Signal Processors (DSPs), Application-Specific Integrated Circuits (ASICs), Field Programmable Gate Arrays (FPGAs), analog computing circuits, and/or the like. The memories comprise Random Access Memory (RAM), flash circuitry, Hard Disk Drives (HDDs), Solid State Drives (SSDs), Non-Volatile Memory Express (NVMe) SSDs, and/or the like. The memories store software like operating system 151, control application 152, machine learning applications 153, vectorization applications, and the like. The microprocessors retrieve the software from the memories and execute the software to drive the operation of environment 100 as described herein.

In some examples, environment 100 implements process 200 illustrated in FIG. 2. In some examples, environment 100 implements process 300 illustrated in FIG. 3. It should be appreciated that the structure and operation of environment 100 may differ in other examples.

FIG. 2 illustrates process 200. Process 200 comprises an equipment monitoring detection process in a natural gas extraction and storage environment. In other examples, process 200 may differ. Process 200 may be implemented in program instructions in the context of any of the software applications, imaging components, module components, machine learning components, or other such elements of one or more computing devices. The program instructions direct the computing device(s) to operate as follows, referred to in the singular for the sake of clarity.

The operations of process 200 comprise orienting a thermal imaging system to view a piece of hydrocarbon storage equipment (step 201). The operations further comprise generating thermal image data depicting the hydrocarbon storage equipment (step 202). The operations further comprise processing the thermal imaging data using the machine learning algorithm trained to identify the status of hydrocarbon storage equipment and responsively generating a machine learning output (step 203). The operations further comprise transferring the machine learning output to downstream systems (step 204).

Figure 3:
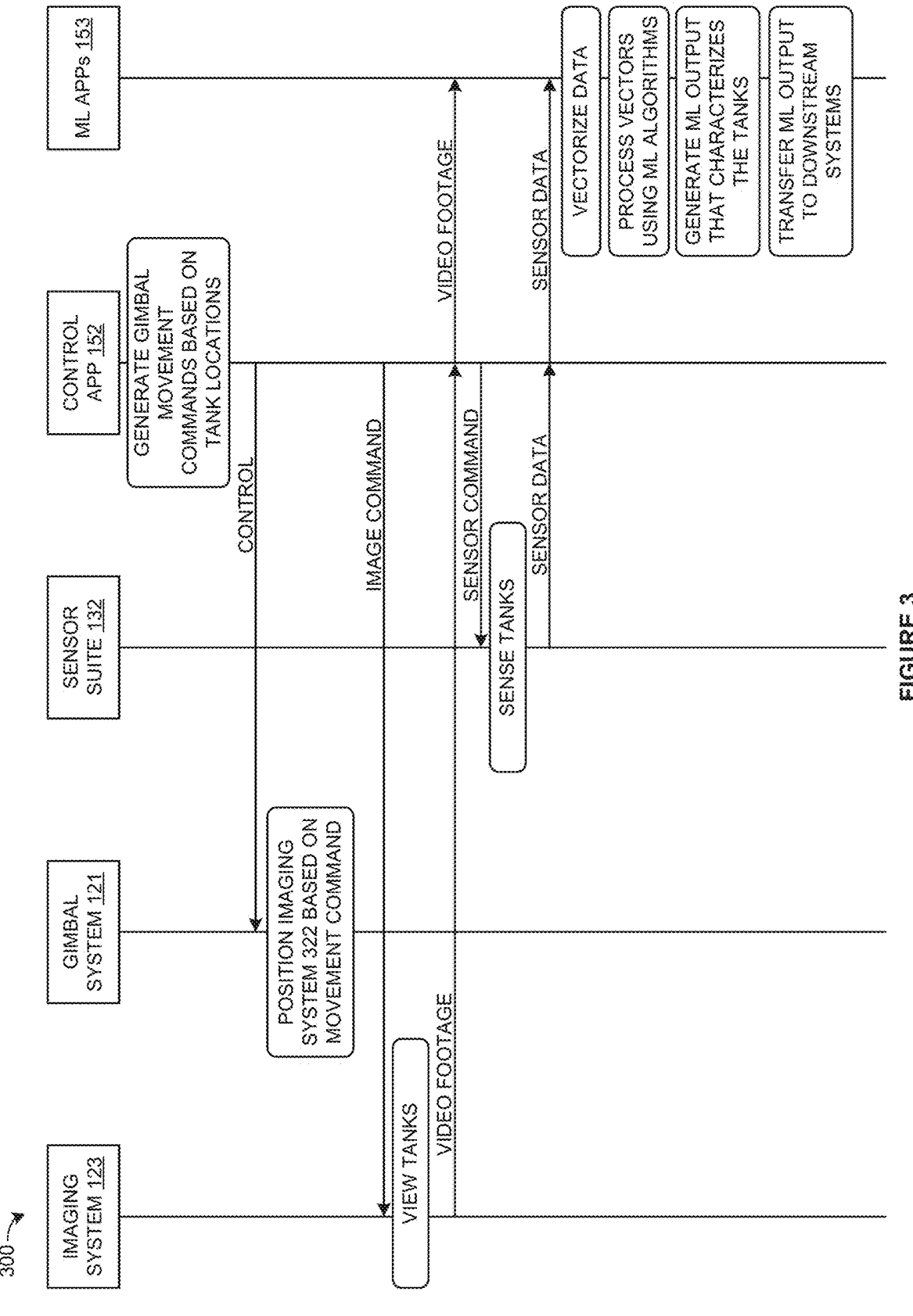
FIG. 3 illustrates an exemplary operation of the hydrocarbon extraction and storage environment.

FIG. 3 illustrates process 300. Process 300 comprises an exemplary operation of environment 100 to monitor tanks 101-103. In some examples, processor 141 retrieves and executes control application 152 from memory 142. Control application 152 retrieves orientation parameters for gimbal 121 that define the current roll, pitch, and yaw of imaging system 123. Control application 152 selects a new field of view for imaging system 123 to view tanks 101-103. Control application 152 calculates roll, pitch, and yaw settings that correspond to the selected field of view and identifies the delta between the current roll, pitch, and yaw and the calculated roll, pitch, and yaw. Control application 152 generates control instructions to drive gimbal 121 to orient imaging system 123 to the calculated roll, pitch, and yaw values and the delta.

Gimbal 121 receives the control instructions from control application 152. Gimbal 121 executes the instructions and responsively generates motor commands for its actuators.

The actuators of gimbal 121 move the rotor elements that control the roll, pitch, and yaw of imaging system 123 based on the motor commands to achieve the roll, pitch, and yaw specified by the control instructions. Gimbal 121 informs control application 152 the roll, pitch, and yaw command has been achieved. In some examples, gimbal 121 and control application 152 form a control loop to update (e.g., continuously adjust) the roll, pitch, and yaw values for imaging system 123 to account for sway in mounting structure 160 and/or other factors that induce error in the field of view of imaging system 123.

Once the desired field of view is achieved, control application 152 transfers an image command to imaging system 123 that drives imaging system 123 to record tanks 101-103. In this example, imaging system 123 comprises a thermal imaging device. Imaging system 123 generates infrared video footage by viewing tanks 101-103. The video footage comprises a sequence of infrared image frames that form a video depicting tanks 101-103 and the surrounding environment. Imaging system 123 transfers the video footage to control application 152 over transceiver 143. In alternative examples, imaging system 123 may generate and transfer one or more still frame infrared images instead of video footage.

Contemporaneously, control application 152 transfers a sensor command to sensor suite 132 that drives sensor suite 132 to sense tanks 101-103. In this example, sensor suite 132 comprises an optical imaging device and a range finder. Sensor suite 132 generates visible spectrum video footage by viewing tanks 101-103 and identifies the distance between tanks 101-103 and detection system 110. The video footage comprises a sequence of visible spectrum image frames that form a video depicting tanks 101-103 and the surrounding environment. Sensor suite 152 transfers the visible spectrum video footage and distance to control application 152 over transceiver 143. In alternative examples, sensor suite 132 may generate and transfer one or more still frame images instead of video. In other examples, suite 132 may generate and transfer other types of sensor data.

Control application 152 receives the video footage and sensor data from imaging system 123 and sensor suite 132, respectively. Processors 141 retrieve and execute machine learning applications 153 from memory 142. Control application forwards the video footage and sensor data to machine learning applications 153. Machine learning application 153 implements a feature extraction process on the received sensor data and video footage. Machine learning applications 153 provide the feature vectors to its constituent machine learning algorithms. In this example, the machine learning algorithms of application 153 comprise algorithms for background detection, motion detection, object detection, gas leak detection, fill level detection, false positive detection, and non-linear summation.

The background detection algorithm processes the feature vectors to identify regions of the infrared image data that depict background portions of environment 100. For example, the background detection algorithm may classify the video depictions of the sky, scenery, and buildings as background. The motion detection algorithm processes the feature vectors to identify regions of the infrared image data that depict motion in environment 110. For example, the motion detection algorithm may classify the movements of a human operator, the movement of a truck, and any gas leaks from tanks 101-103 as motion. The object detection algorithm processes the feature vectors to identify regions of the infrared image data that depict hydrocarbon storage, transfer, and extraction equipment. For example, the object detection algorithm may classify tanks 101-103 as pieces hydrocarbon storage equipment. The leak detection algorithm processes the feature vectors to identify regions of the infrared image data that depict leaks (e.g., natural gas leaks) from tanks 101-103. For example, leak detection algorithm may identify a group of pixels in the infrared image data the corresponds to the movement of a gas leak. The fill level detection algorithm processes the feature vectors to identify the fill level in tanks 101-103. It should be appreciated that the filled portion of a fuel tank has a different heat capacity and thermal conductivity than the unfilled portion of a fuel tank. Accordingly, the surface of tank that corresponds to the filled portion appears differently in infrared images than the surface of the tank that corresponds to the unfilled portion. The fill level detection algorithm may identify color differences in the thermal footage of tanks 101-103 to detect the filled and unfilled portions of tank 101 to determine the fill level. The false positive algorithm processes the feature vectors to screen for false positive readings from the fill level and leak detection algorithms. For example, the false positive algorithm may identify intentional venting from tanks 101-103 erroneously classified as a leak as a false positive or may identify a shadow/reflection on the surface of tanks 101-103 erroneously classified as a fill level as a false positive.

The non-linear summation algorithm processes the feature vectors and combines the outputs from the other models to generate a machine learning output. The machine learning output indicates the status of tanks 101-103, including information characterizing their fill levels, any detected gas/fuel leaks, or other information characterizing tanks 101-103. The output may comprise multi-modal video footage of tanks 101-103 (e.g., thermal video and visible spectrum video). Machine learning applications 153 drive transceiver 143 to transfer the machine learning output to an external user system. The external user system receives and displays the machine learning output. The display includes the indication confirming the existence of any leaks from tanks 101-103, fill levels of tanks 101-103, confidence metrics, tank GPS coordinates, date and time, tank Identifier (ID) number, and the like. The external user system may transfer an alert (e.g., text message notification) for delivery to human operators on site in environment 100 to respond to any issues identified by the machine learning output generated by detection system 110.

Figure 4:
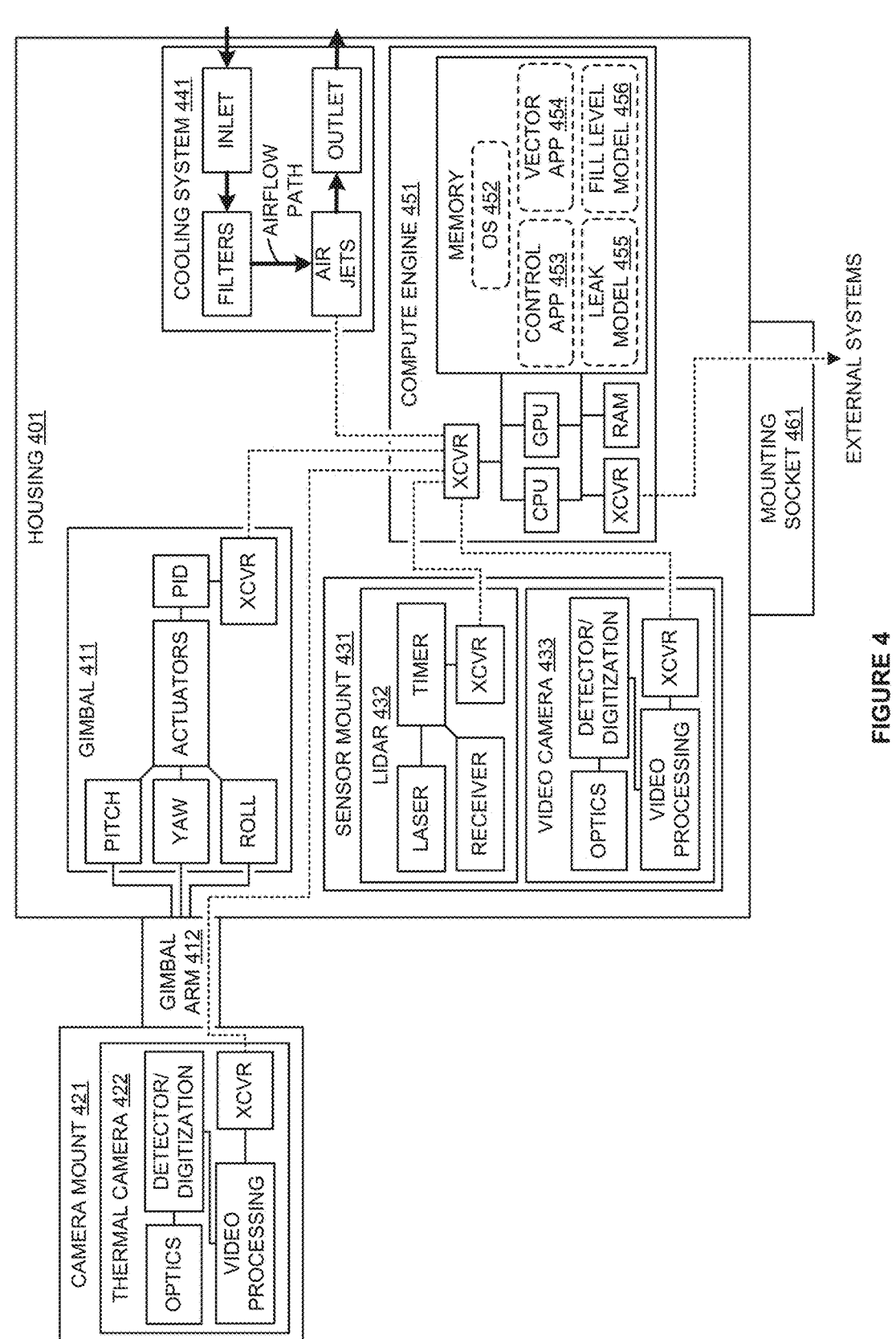
FIG. 4 illustrates an exemplary block diagram of a detection system for a hydrocarbon extraction and storage environment.

FIG. 4 illustrates detection system 400 to monitor hydrocarbon storage and extraction environments. For example, detection system 400 may detect and classify fuel leaks, fill levels, or other information characterizing the status of hydrocarbon storage, transfer, and extraction equipment. Hydrocarbon detection system 400 comprises an example of detection system 110 illustrated in FIG. 1, however detection system 110 may differ. Detection system 400 comprises housing 401, gimbal 411, gimbal arm 412, camera mount 421, thermal camera 422, sensor mount 431, lidar 432, video camera 433, cooling system 441, compute engine 451, and mounting socket 461. Compute engine 451 hosts operating system 452, control application 453, vectorization application 454, leak detection model 455, and fill level detection model 456. In other examples, detection system 400 may include fewer or additional components than those illustrated in FIG. 4. Likewise, the illustrated components of system 400 may include fewer or additional components, assets, or connections than shown.

Housing 401 provides structural support to gimbal 411, camera mount 421, sensor mount 431, cooling system 441, and compute engine 451. Gimbal 411, sensor mount 431, cooling system, and compute engine 451 are mounted internally in housing 401 while camera mount 421 and gimbal arm 412 are mounted externally to housing 401. Housing 401 comprises a metallic frame that shields the internal components from the external environment. Housing 401 may comprise an aluminum frame, a stainless-steel frame, a rigid plastic frame, rubber gaskets, screws, and/or other elements to enclose and protect the interior components. Mounting socket 461 is positioned on the exterior of housing 401 and is configured to detachably couple housing 401 to a mounting structure. For example, mounting socket 461 may comprise a female socket that may screw onto a corresponding male socket of the mounting structure.

Gimbal 411 is representative of a pan and tilt system to maneuver camera mount 421 via gimbal arm 412 to adjust the roll, yaw, and pitch of thermal camera 422 to focus camera 422 on a desired field of view. Gimbal 411 comprises pitch, yaw, and roll rotors/stators, actuators, a PID controller, and a transceiver (XCVR) coupled over bus circuitry. The actuators comprise electric motors that adjust the positions of the pitch, yaw, and roll rotors/stators in response to control signaling received from compute engine 451. The pitch, yaw, and roll rotors/stators move gimbal arm 412 and camera mount 421 to focus thermal camera 421 at a desired field of view, typically to image natural gas, petroleum, refined petroleum, or petrochemical storage, transfer, and extraction equipment. In some examples, gimbal 411 implements a PID control loop to maintain the field of view of camera 421 to compensate for movement of detection system 400. Gimbal 411 may comprise or be coupled to a gyroscope that tracks the spatial orientation of housing 401. For example, housing 401 may be mounted to a tower that sways which induces an error into the field of view of thermal camera 422. The PID controller, actuators, and gyroscope may interface to adjust the pitch, yaw, and roll settings based on the movement of housing 401 to maintain the field of view of thermal camera 422. Although the pitch, yaw, and roll control elements are illustrated within gimbal 411, one or more of the pitch, yaw, and roll control elements may instead be located in gimbal arm 412 or camera mount 421.

Camera mount 421 is coupled to housing 401 by gimbal arm 412 and mounts thermal camera 422. Mount 421 and camera 422 comprise compatible quick-connect sockets. Exemplary quick connect sockets include snap connections, screw connections, and the like. Camera 422 may snap into camera mount 421 to detachably couple camera 422 to housing 401. The quick connect sockets increase the modularity of system 400 and allow camera 422 to be efficiently swapped out for a different type of imaging device (e.g., an optical video camera). The quick-connect sockets may comprise electrical, communication, and mechanical connections to electrically, mechanically, and communicatively couple thermal camera 422 to the other elements of system 400.

Thermal camera 422 comprises a Forward Looking Infrared (FLIR) camera to image hydrocarbon storage, extraction, and transfer equipment. Thermal camera 422 comprises optics, photon detection and digitization circuitry, video processing circuitry, and a transceiver connected over bus circuitry. Thermal camera 422 comprises a metallic and/or rigid plastic housing to encase the camera circuitry. The optics comprise components like lenses to capture photons in the infrared spectrum and reflect radiation in the visible and ultraviolet spectrums. Photons reflected and emitted by hydrocarbon equipment in the infrared spectrum enter the optics and are passed to the detector/digitation circuitry. The detector/digitization circuitry comprises a Focal Plane Array (FPA) of micrometer size pixels constructed from infrared sensitive materials. The detector/digitation circuitry detects the photons and generates a corresponding digital signal that represents the temperature of the hydrocarbon equipment and surrounding environment and passes this signal to the video processing circuitry. The video processing circuitry comprises components like Digital Signal Processors (DSPs) to translate the digital signal into and infrared image of the equipment. The transceiver transfers the resulting thermal image to compute engine 451 over a communication link. The communication link may comprise sheathed metallic wiring and bus circuitry. The communication link traverses camera mount 421 and gimbal arm 412.

Sensor mount 431 is embedded in the body of housing 401 and mounts lidar 432 and video camera 433. Sensor mount 431 comprises a female socket that may receive a compatible sensor package. In this example, the sensor package comprises lidar 432 and video camera 433. Sensor mount 431 and the sensor package comprise compatible quick-connect sockets. The sensor package inserts into sensor mount 431 and snap connects. The quick-connect sockets comprise electrical, communication, and mechanical connections. When sensor mount inserts into mount 431, the resulting connection electrically, mechanically, and communicatively couples lidar 432 and video camera 433 to the other elements of system 400. These quick connect sockets further increase the modularity of system 400 and allow different sensor packages to be efficiently swapped out.

Lidar 432 comprises laser rangefinder to measure the distance between hydrocarbon storage, extraction, and transfer equipment and system 400. Lidar 432 comprises a laser, receiver, timer, and a transceiver connected over bus circuitry. Lidar 432 may comprise a metallic and/or rigid plastic housing to encase the circuitry. Laser 432 emits a laser beam towards a monitored piece of equipment in response to control signaling received from compute engine 451. The beam reflects off of the equipment and is detected by the receiver. The timer measures the amount of time that elapsed between emission and detection of the beam and correlates that amount of time to a distance. The transceiver transfers the resulting distance calculation to compute engine 451 over a communication link. The communication link may comprise sheathed metallic wiring and bus circuitry. The communication link traverses sensor mount 431.

Video camera 433 comprises a camera to image hydrocarbon storage, extraction, and transfer equipment in the visible spectrum. Video camera 433 comprises optics, photon detection and digitization circuitry, video processing circuitry, and a transceiver connected over bus circuitry. Video camera 433 may comprise a metallic and/or rigid plastic housing to encase the camera circuitry. The optics comprise components like lenses to capture photons in the visible spectrum and reflect radiation in the infrared and ultraviolet spectrums. Photons reflected and emitted by hydrocarbon equipment in the visible spectrum enter the optics and are passed to the detector/digitation circuitry. The detector/digitization circuitry comprises an FPA of micrometer size pixels constructed from visible spectrum sensitive materials. The detector/digitation circuitry detects the photons and generates a corresponding digital signal that represents the view of the hydrocarbon equipment and surrounding environment and passes this signal to the video processing circuitry. The video processing circuitry comprises components like DSPs to translate the digital signal into a video of the equipment. The transceiver transfers the resulting video to compute engine 451 over a communication link. The communication link may comprise sheathed metallic wiring and bus circuitry. The communication link traverses sensor mount 431.

Cooling system 441 is representative of a temperature regulator to pass air over compute engine 451 and shed the heat generated by engine 451 to the exterior environment. Colling system 441 comprises an air inlet, filters, air jets, and an outlet. Although illustrated as being separate from compute engine 451, cooling system 441 and engine 451 are typically integrated so that the airflow pathway traverses the computing elements of engine 451 and/or other elements within housing 401 that generate excessive heat. Air jets pull air into housing 401 though inlet. The filters block particulate matter (e.g., dust, sand, etc.) and moister (e.g., water droplets, rain, etc.) from entering housing 401. Air jets blow the air over the computing elements of engine 451. Heat generated by the commuting elements transfers to the flowing air through convective and conductive heat transfer. The air jets drive the heated air out of housing 401 through the outlet. The air outlet may also comprise filters to inhibit particulate matter and moister from entering housing 401.

Compute engine 451 is a computing device comprising transceivers, CPU, GPU, RAM, and memory coupled over bus circuitry. Compute engine 451 typically comprises other computing elements like power supply, however these are omitted for clarity. The memory stores operating system 452, control application 453, vectorization application 454, leak detection model 455, fill level detection model 456, and typically other software like user applications, communication protocols, firmware, and the like. Operating system 452 comprises software to manage the hardware and software resources in compute engine 451. Control application 453 comprises software to control the operation of gimbal 411, camera 422, lidar 432, video camera 433, and cooling system 441. Vectorization application 454 is representative of one or more applications, modules, and the like to convert thermal video, optical video, lidar outputs, and/or other data into a consumable format for machine learning models 455 and 456. Leak detection model 455 comprises machine learning algorithms trained to detect leaks from hydrocarbon storage, transfer, and extraction equipment. Fill level detection model 456 comprises machine learning algorithms trained to measure fill levels in hydrocarbon storage, transfer, and extraction equipment. The components of compute engine 451 may comprise snap connections to attach to housing 401. The snap connections allow for the computing components to be easily attached and swapped out, increasing the modularity of system 400. For example, the snap connections may allow for the GPU to be efficiently replaced to upgrade the hardware of system 400.

The processors (e.g., the CPU and GPU) retrieve and execute control application 453 from memory to monitor proximate hydrocarbon storage, transfer, and extraction equipment. Control application 453 generates control signaling that directs gimbal 411 to adjust the pitch, roll, and yaw of thermal camera 422 to focus the field of view if camera 422 on the equipment. Control application 453 generates control signaling that directs thermal camera 422 to generate a thermal video feed. Control application 453 generates control signaling that directs lidar 432 to measure the distance of the equipment. Control application 453 generates control signaling that directs video camera 433 to generate an optical video feed. Control application 453 generates control signaling to set the speed of the air jets based on CPU and GPU temperature. A transceiver in compute engine 451 transfers the control signaling to transceivers in respective ones of gimbal 411, thermal camera 422, lidar 432, and video camera 433, and to the air jets.

Subsequently, a transceiver in compute engine 451 receives thermal video from thermal camera 422, distance measurements from lidar 432, and optical video from camera 433. The processors (e.g., the CPU and GPU) retrieve and execute vectorization application 454 from memory to vectorize the thermal video, optical video, and distance measurements. Vectorization application 454 generates numeric representations of the pixels that compose the thermal video, the pixels that compose the optical video, and the distance measurements and groups the numeric representations into feature vectors.

The processors (e.g., the CPU and GPU) retrieve and execute leak detection model 455 and fill level model 456. Machine learning models 455 and 456 ingest the feature vectors generated by application 454. Leak detection model 455 comprises algorithms trained to classify equipment in thermal images, algorithms trained to classify motion in thermal images, algorithms trained to classify background environment in thermal images, and algorithms trained to classify gas leaks in thermal images. Model 455 comprises non-linear functions trained to confirm leak indications, screen for false positive outputs, and calculate metrics to characterize the detected leak. The object detection algorithms process the feature vectors to identify portions of the thermal video that depict the equipment. The motion detection algorithms process the feature vectors to identify portions of the thermal video that depict motion. The background detection algorithms process the feature vectors to identify portions of the thermal video that depict the background environment. The leak detection algorithms process the feature vectors to identify portions of the thermal video that depict gas/fuel leaks from equipment. The non-linear functions process the algorithm outputs to confirm detected leaks and calculate metrics to characterize the leaks like volumetric flowrate based on the distance measured by lidar 432. Leak detection model 455 generates a machine learning output identifying any detected gas leaks and the associated metrics. A transceiver in compute engine 551 transfers the machine learning output to downstream systems over a communication link that traverses mounting socket 461.

Fill level detection model 456 comprises algorithms trained to classify equipment in thermal images, algorithms trained to detect shadows and reflections in thermal images, and algorithms trained to detect fill levels in thermal images. Model 456 comprises non-linear functions trained to confirm fill indications, screen for false positive outputs, and calculate metrics to characterize the detected fill level. The object detection algorithms process the feature vectors to identify portions of the thermal video the depict the equipment. The shadow/reflection algorithms process the feature vectors to identify portions of the thermal video that depict shadows and reflections. The fill detection algorithms process the feature vectors to identify portions of the thermal video that depict the fill level. The non-linear functions process the algorithm outputs to confirm the detected fill level and calculate metrics to characterize the height of the fill level, the volume of the fuel, and the like. Fill level model 456 generates a machine learning output comprising the detected fill level and the associated metrics. A transceiver in compute engine 551 transfers the machine learning output to downstream systems over a communication link that traverses mounting socket 461. Models 455 and/or 456 may overlay the optical and infrared video to generate multi-layered videos and include the multi-layered videos in the outputs.

Advantageously, detection system 400 effectively and efficiently monitors hydrocarbon storage, extraction, and transfer equipment. Housing 411 and the filters in cooling system 441 effectively protect the other components of system 400 to withstand harsh environmental conditions. Moreover, system 400 possesses thermal and optical imaging to provide multi-modal imaging to enhance its monitoring capabilities. Furthermore, the quick connect adaptors in camera mount 421, sensor mount 431, and compute engine 451 allow for efficient swapping of cameras, sensor packages, and computing elements, reducing the time required for maintenance and upgrade.

Figure 5A:
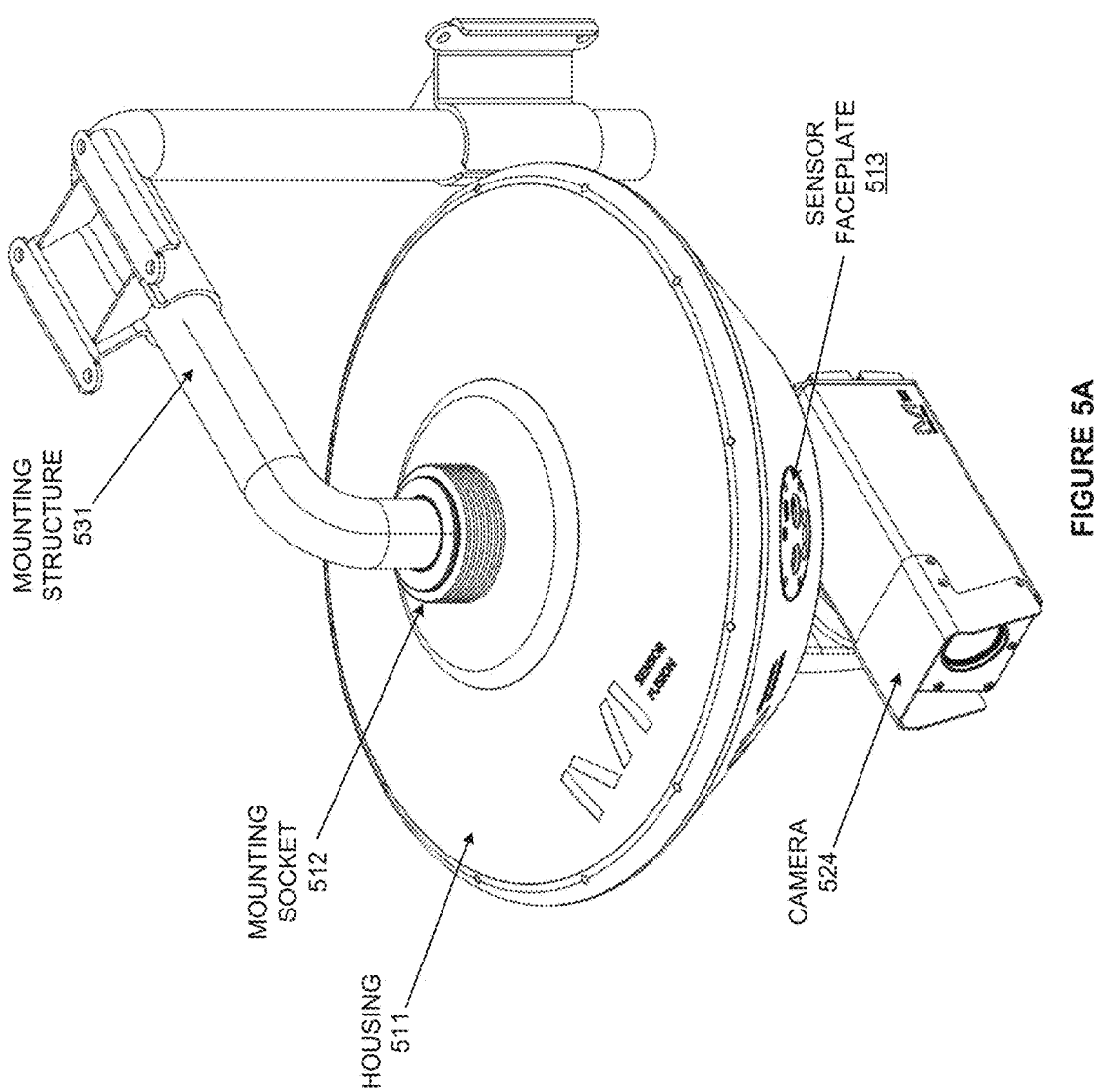
FIGS. 5A-5C illustrate an exemplary schematic view of a multimodal sensor platform for a hydrocarbon extraction and storage environment.
Figure 5B:
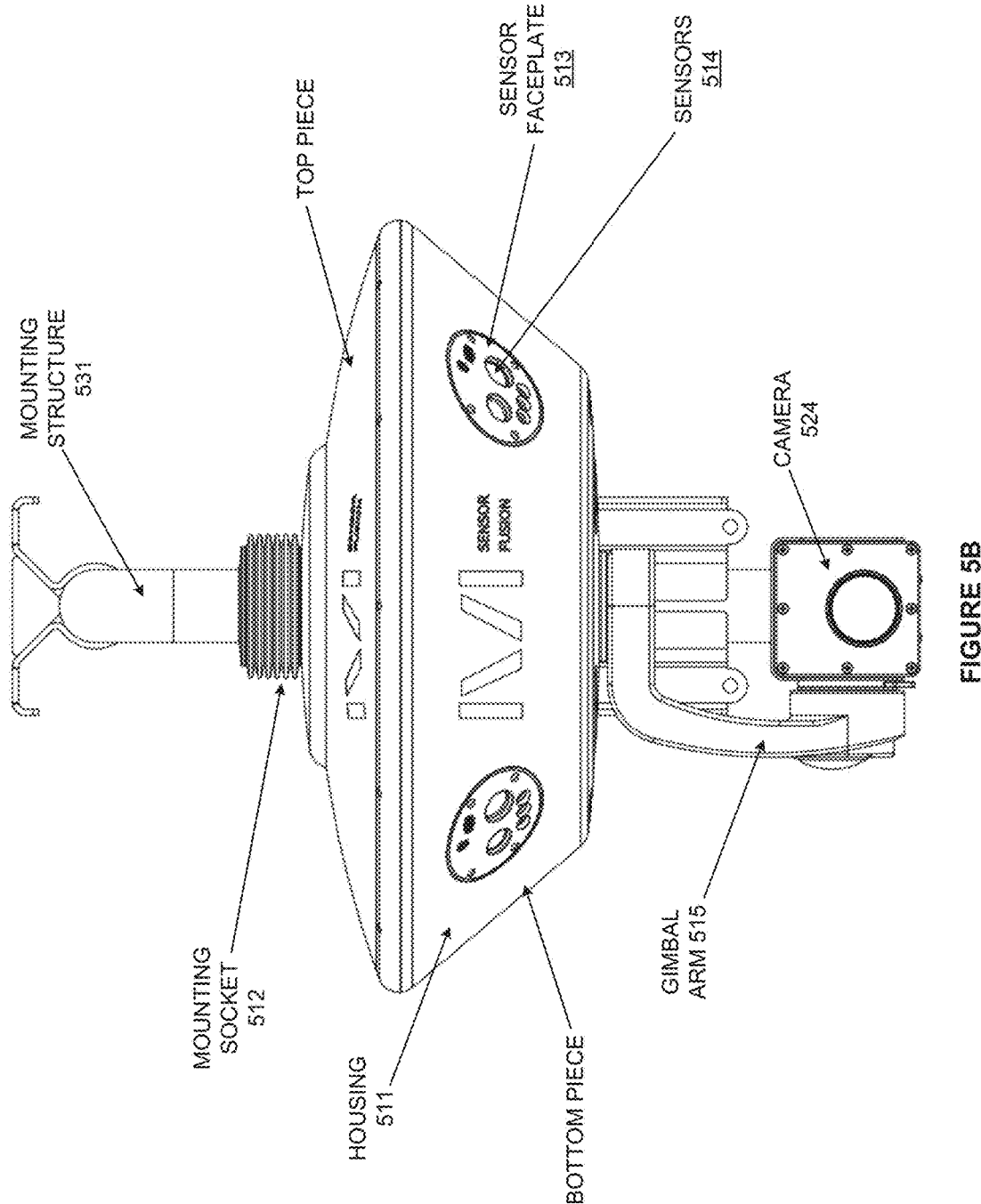
Figure 5C:
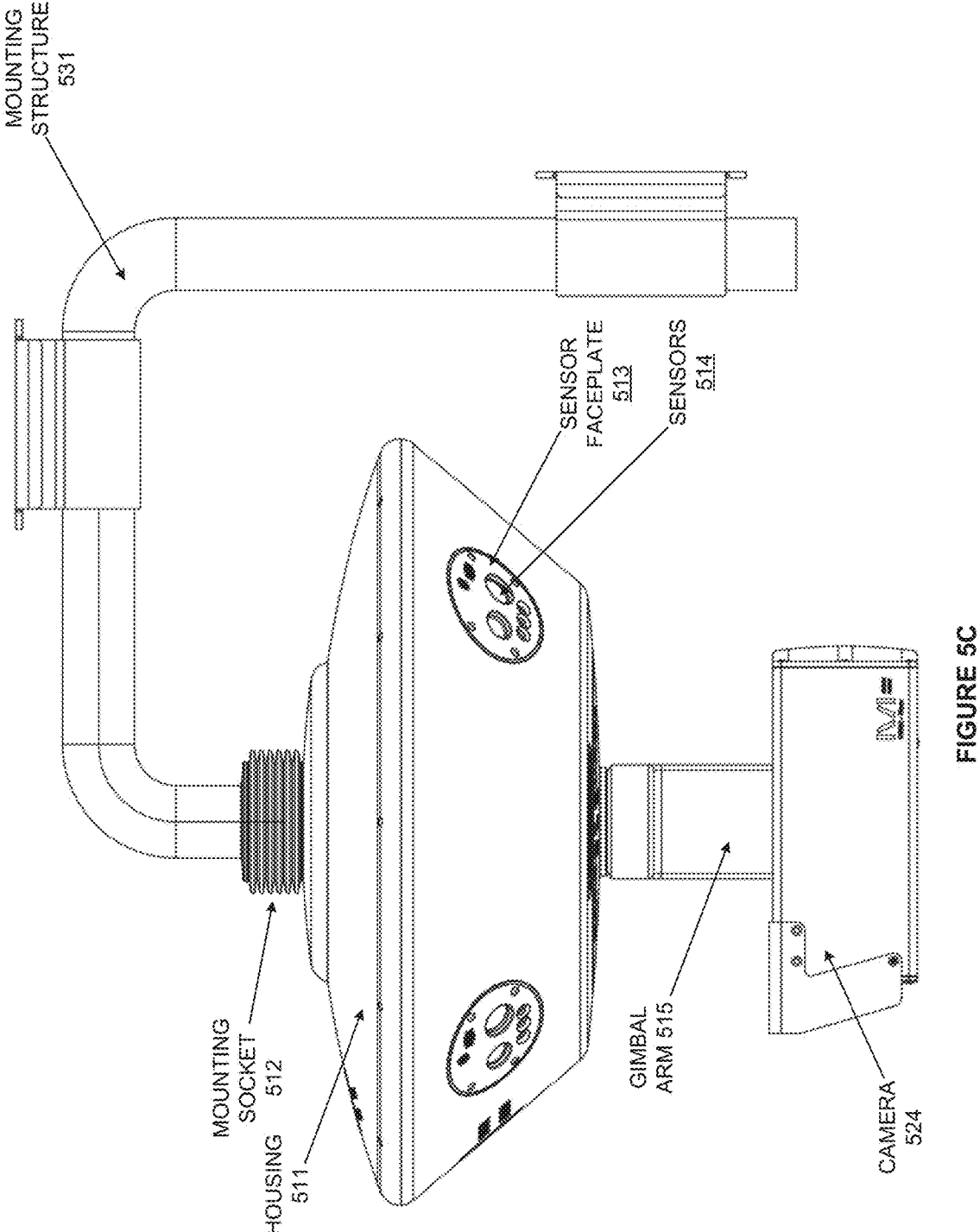

FIGS. 5A-5C illustrate a schematic view of multimodal sensor platform 500. Platform 500 comprises an example of detection system 110 illustrated in FIG. 1 and detection system 400 illustrated in FIG. 4, however systems 110 and 400 may differ. Platform 500 is representative of a modular sensor fusion platform to monitor petroleum and natural gas storage, extraction, and transfer equipment. FIG. 5A illustrates a perspective view of platform 500. FIG. 5B presents a front view of platform 500, and FIG. 5C presents a side view of platform 500. Sensor platform 500 comprises housing 511, mounting socket 512, sensor faceplate 513, sensors 414, gimbal arm 515, camera 524, and mounting structure 531.

In some examples, housing 511 is a two-piece metallic, weatherproof enclosure that holds the internal components of platform 500. The top piece of housing 511 is typically attached to the bottom piece of housing 511 using screws, however housing 511 may utilize other detachable coupling mechanisms like snap connections, magnetics, and the like. The two-piece construction allows housing 511 to be opened to access the internal components. The top and bottom pieces of housing 511 comprise machined aluminum. The bottom piece may comprise a rubber gasket at the interface with the top piece that compresses when the pieces are screwed together to seal off the interior from the external environment. Housing 511 may comprise additional gaskets at other locations to seal off the other external interfaces (e.g., at the attachment point of sensors 514. Mounting socket 512 and mounting structure 531 comprises compatible male/female quick connect sockets to couple platform 500 to mounting structure 531. Socket 512 may comprise a threaded connection, snap connection, and/or some other detachable connection. Mounting structure 531 typically comprises a pole to position platform 500 at elevation to increase the field of view of camera 524 and sensors 514.

Camera 524 comprises a FUR camera mounted to gimbal arm 515. In other example, camera 524 may comprise a different imaging modality. Camera 524 generates an infrared video feed depicting hydrocarbon storage, transfer, and extraction equipment. Gimbal arm 515 attaches camera 524 to housing 511. Gimbal arm 515 comprises rotors and actuators to control the pan and tilt of camera 524. Gimbal 515 pans camera 524 around the vertical axis of platform 500. Gimbal arm 515 tilts camera 524 vertically up/down. Sensors 414 are representative of sensor packages (e.g., lidar, visible spectrum cameras, thermometers, etc.) embedded in housing 511. Sensor faceplate 513 is representative of a cover to shield the internal components of sensors 514. Faceplate 513 and sensors 514 form a sensor package that may be inserted into housing 511. Faceplate 513 and sensors 514 comprise quick connects to detachably couple to housing 513. The detachable coupling allows the sensor packages to be quickly swapped out for different sensor packages.

Figure 6A:
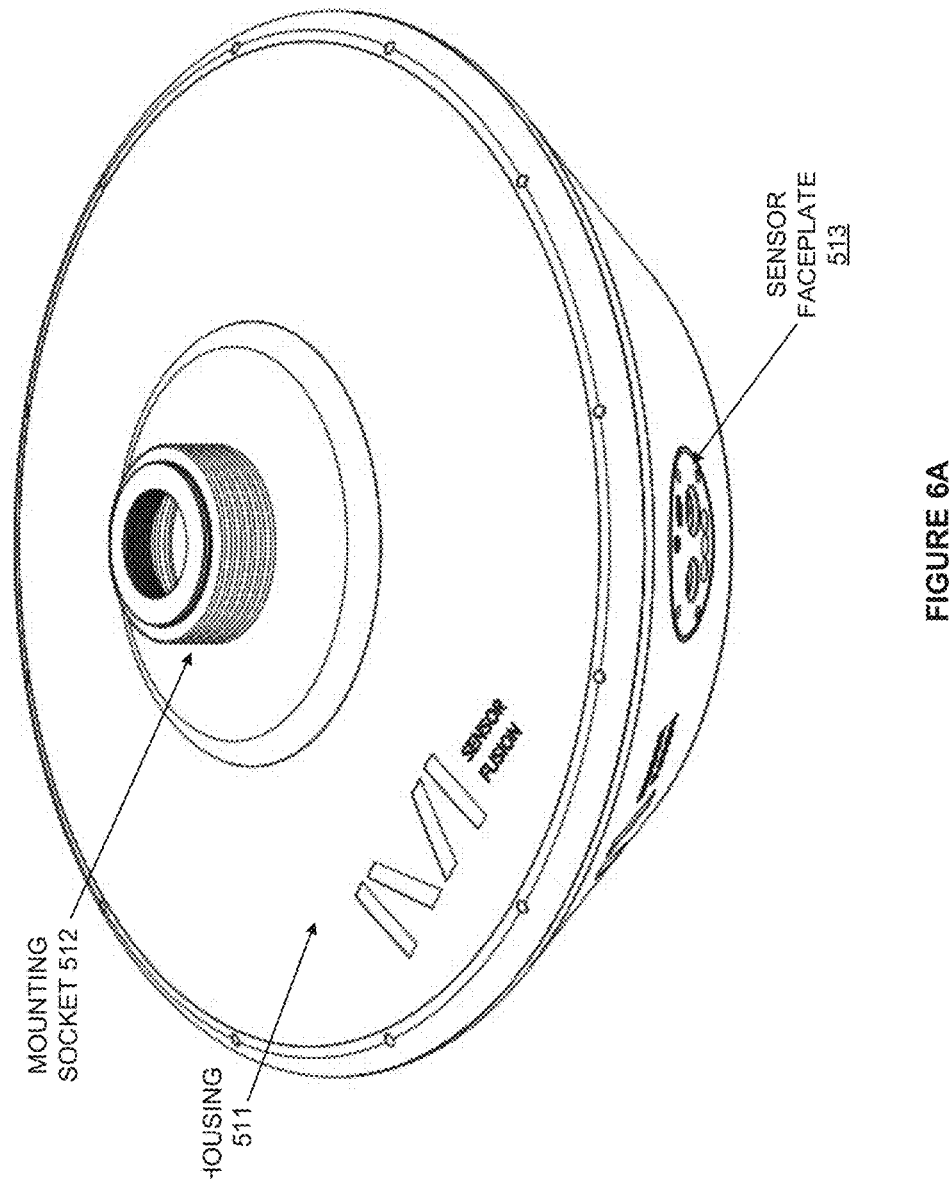
FIGS. 6A-6C illustrate an exemplary schematic view of the sensor platform.
Figure 6B:
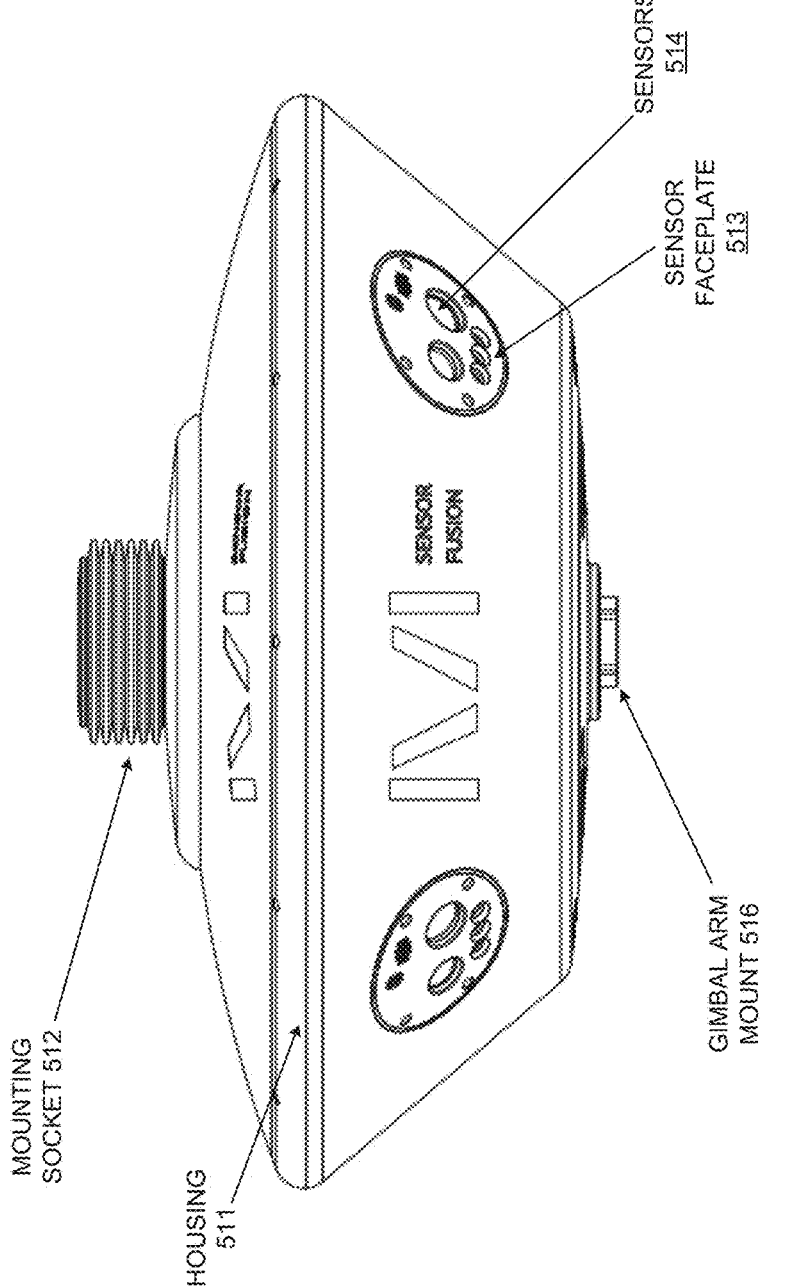
Figure 6C:
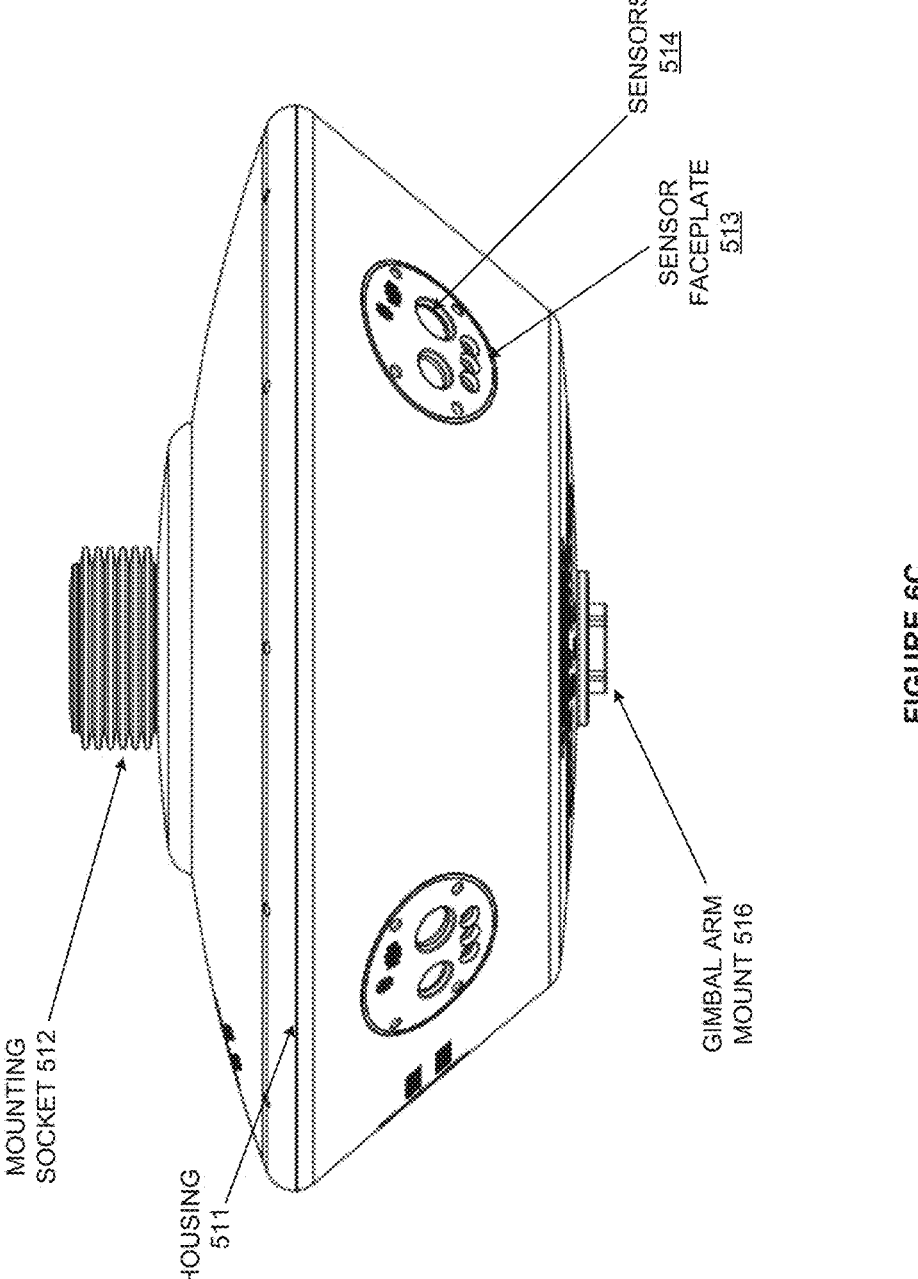

FIGS. 6A-6C illustrate a schematic view of the body of sensor platform 500. FIG. 6A presents a perspective view of the body of platform 500, FIG. 6B presents a front view of the body of platform 500, and FIG. 6C presents a side view of the body of platform 500. These views illustrate housing 511, mounting socket 512, sensor faceplate 513, sensors 514, and gimbal arm mount 516. Gimble arm mount 516 couples gimble arm 515 to housing 511.

Figure 7A:
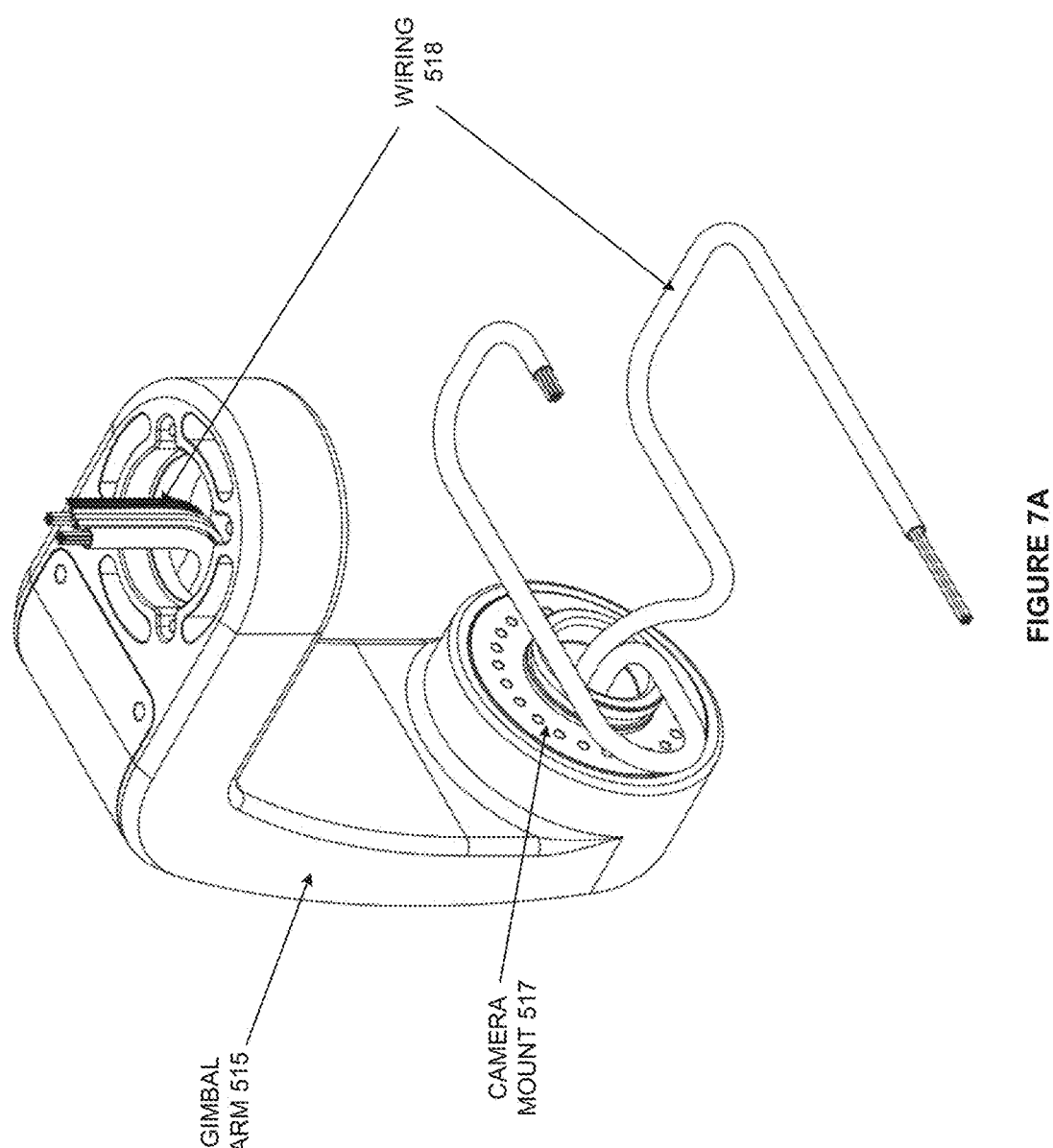
FIGS. 7A-7C illustrate an exemplary schematic view of a gimbal arm of the sensor platform.
Figure 7B:
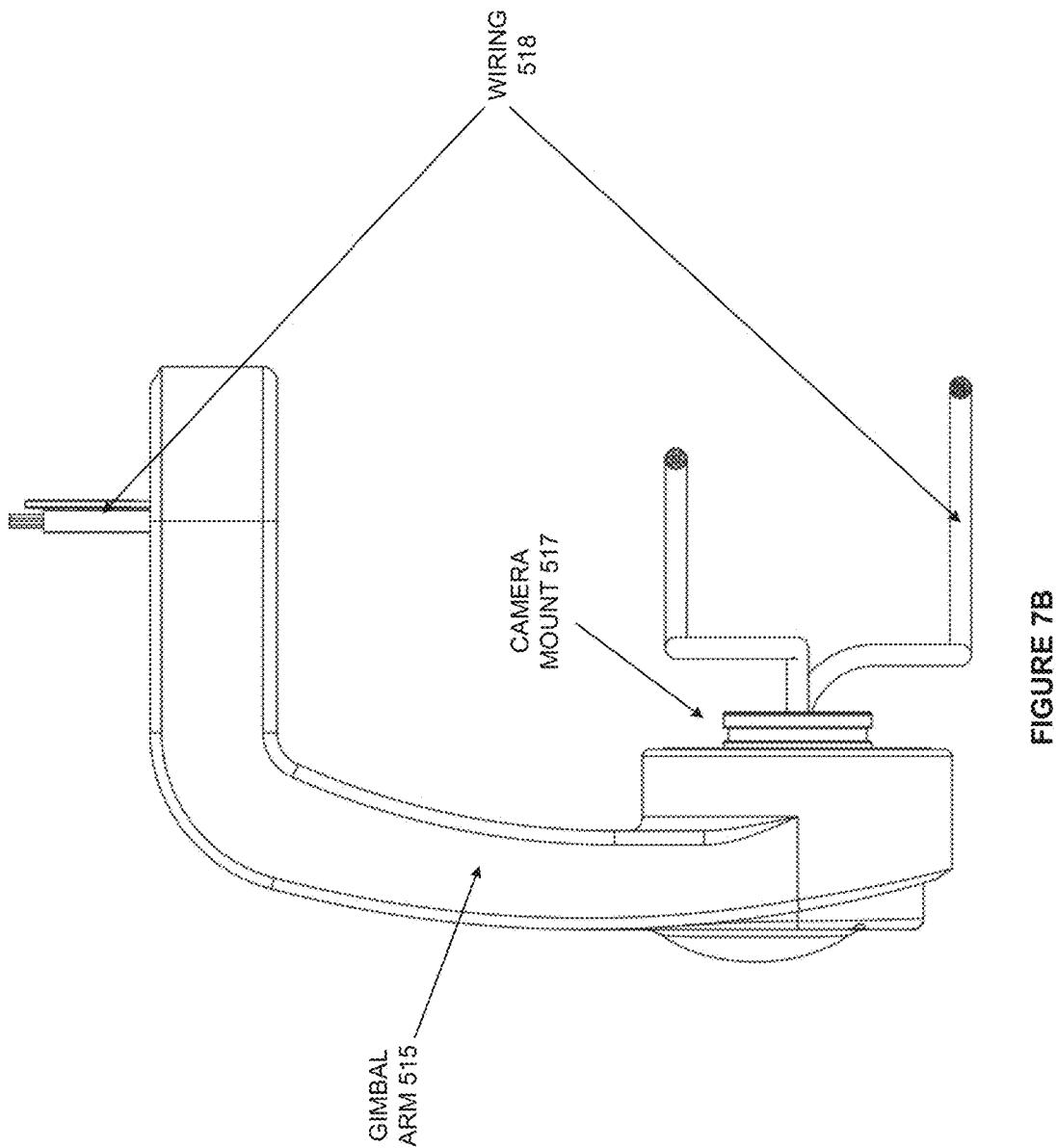
Figure 7C:
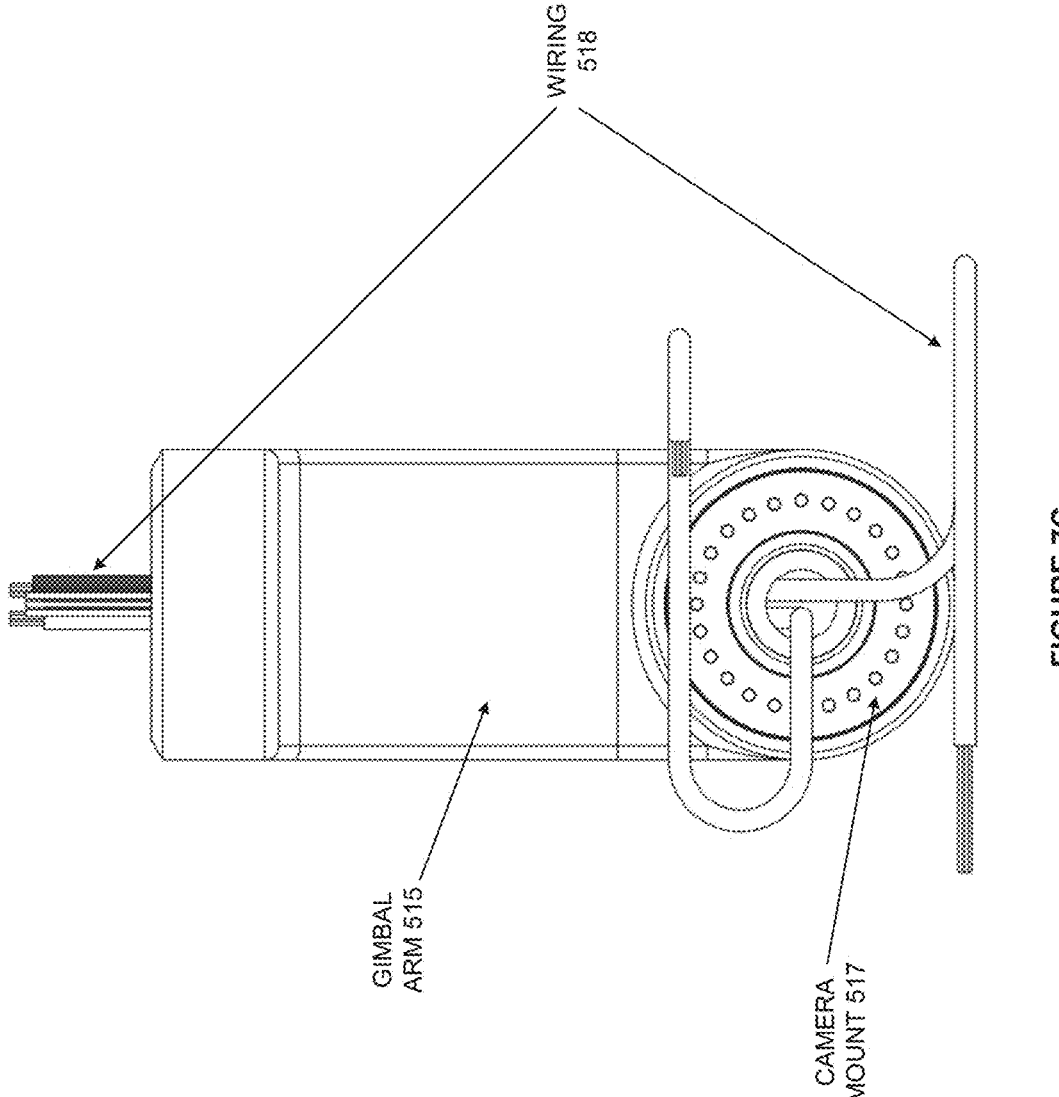

FIGS. 7A-7C illustrate a schematic view of gimbal arm 515 in sensor platform 500. FIG. 7A presents a perspective view of gimbal arm 515, FIG. 7B presents a front view of gimbal arm 515, and FIG. 7C presents a side view of gimbal arm 515. Gimbal arm 515 comprises camera mount 517 and wiring 518. Wiring 518 comprises sheathed metallic wires and provides communication and power links between camera 524 and the internal components of platform 500. Camera mount 517 comprises a snap connection to attach camera 524 and a rotor to manipulate the tilt access of camera 524. For example, camera mount 517 may tilt camera 524 down to place a natural gas storage vessel in the field of view of camera 524. Camera 524 may then transfer the resulting video feed to other components in platform 500 over wiring 518. In other examples, wiring 518 may be replaced by or used in addition with a wireless communication system.

Figure 8A:
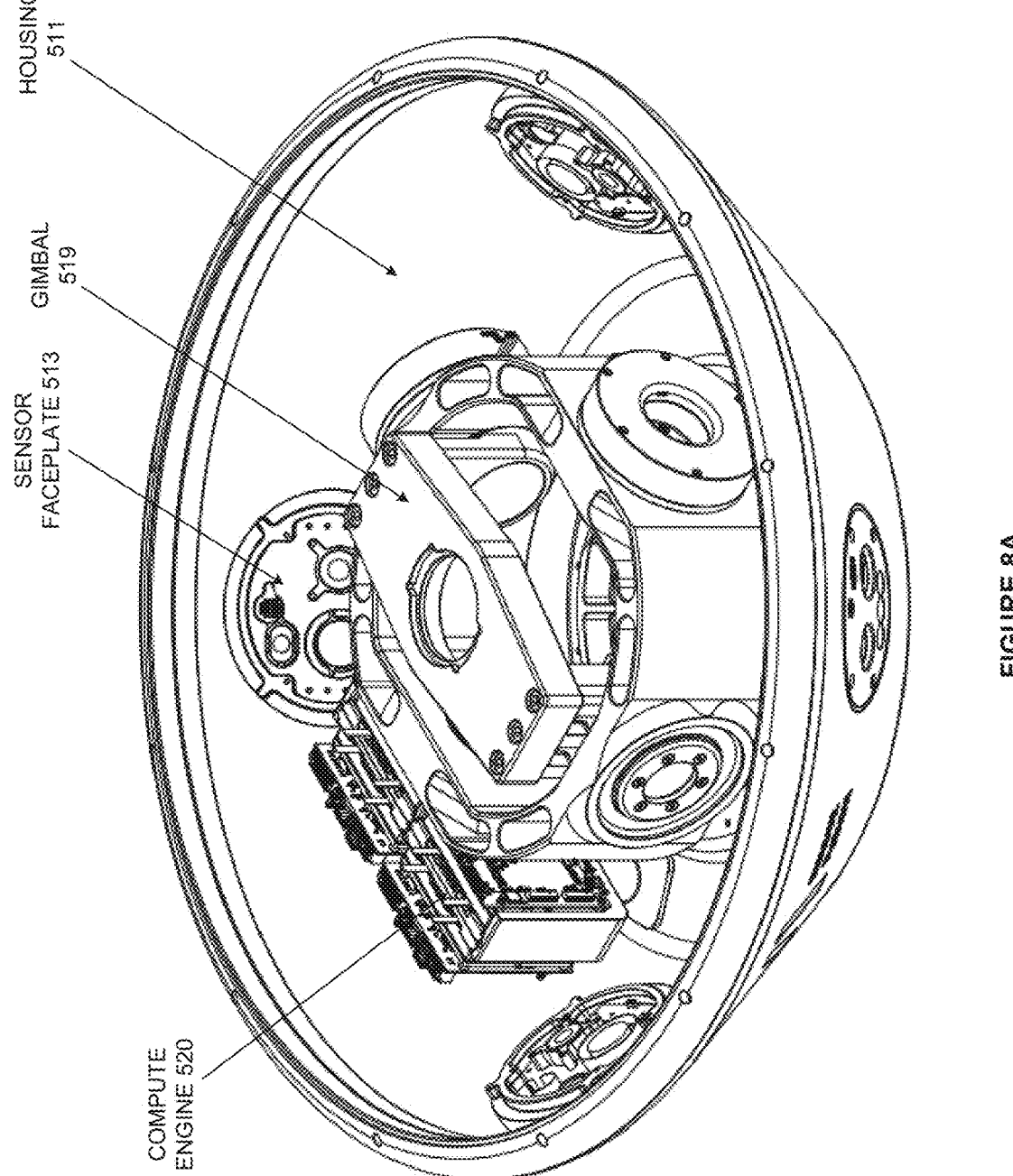
FIGS. 8A-8C illustrate an exemplary schematic view of the sensor platform.
Figure 8B:
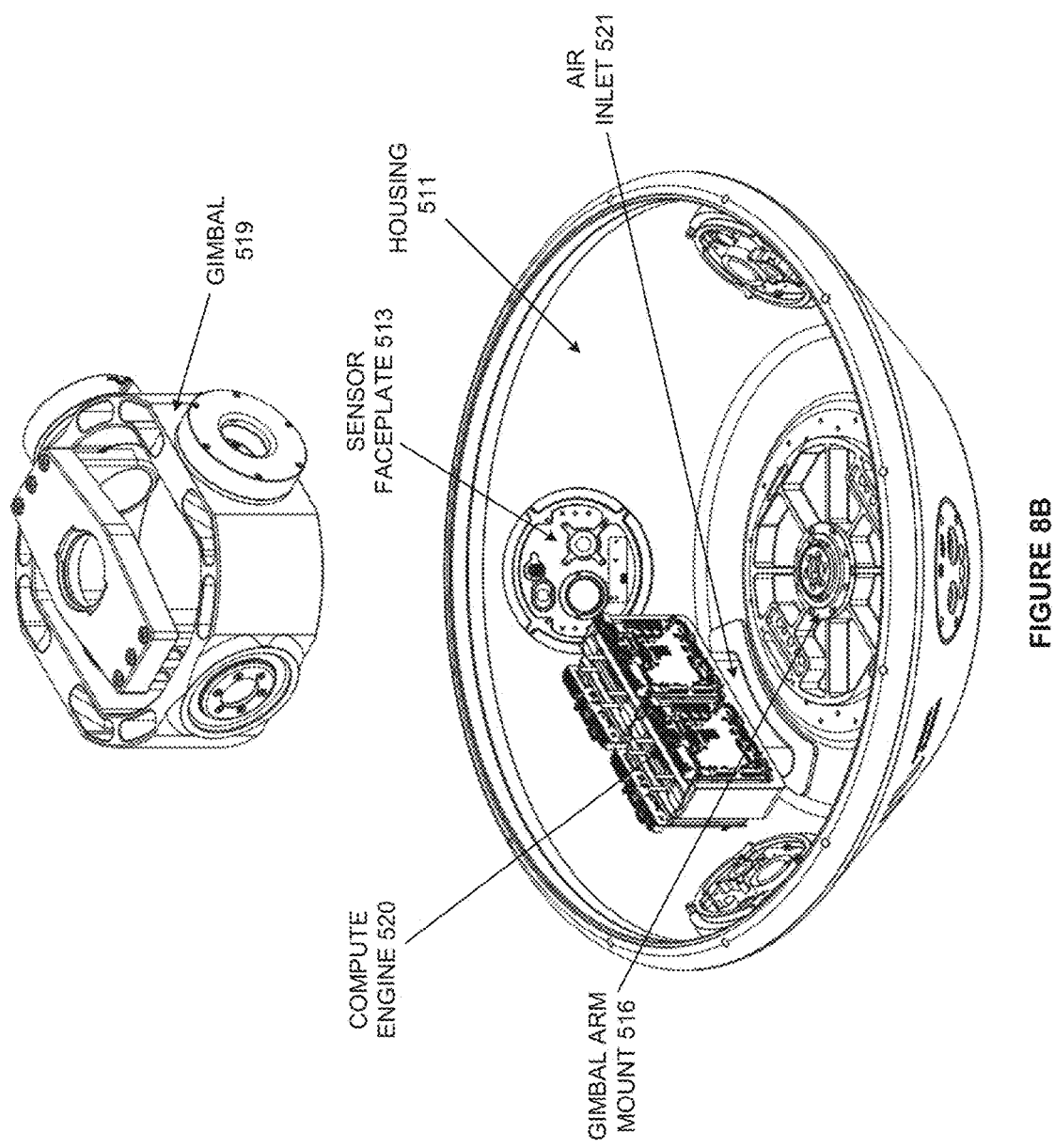
Figure 8C:
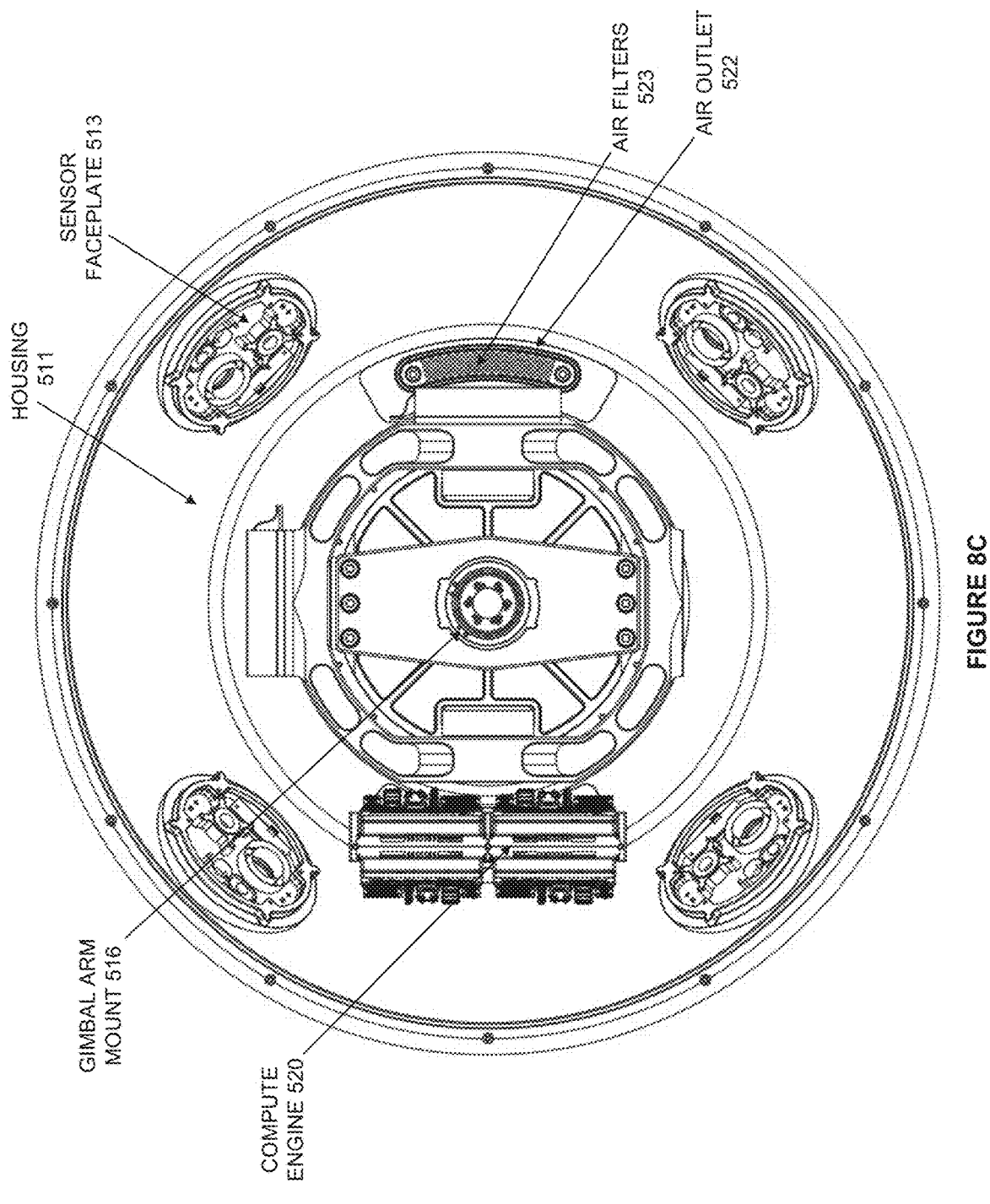

FIGS. 8A-8C illustrate a schematic view of the interior of the body of sensor platform 500. FIG. 8A presents a perspective view of the interior of the body of sensor platform 500, FIG. 8B presents another perspective view of the interior of the body of sensor platform 500, and FIG. 8C presents a top-down view of the interior of the body of sensor platform 500. These views illustrate the bottom piece of housing 511, the internal side of sensor faceplates 513, gimbal arm mount 516, gimbal 519, compute engine 519, air inlet 521, air outlet 522, and air filters 522. Housing 511 mounts gimbal 519 and compute engine 520. Gimbal 519 comprises electric motors, rotors, stators, and the like to control the pan and roll axes of camera 524. For example, a first rotational axis of gimbal 519 may move housing 511 to control the roll axis of camera 524 while a second rotational axis of gimbal 519 may rotate gimbal arm 515 around gimbal arm mount 516 to control the pan axis of camera 524. Gimbal 519 and compute engine 520 may form a PID control loop to continually adjust the pan, tilt, and roll axes of camera 524 to counter any positional errors in the field of view of camera 524 (e.g., swaying of mounting structure 531).

Compute engine 520 comprises processors (e.g., GPU and CPU), memory (e.g., RAM and SSD), and transceivers connected over bus circuitry. The memory stores software like operating systems, control application, vectorization applications, and machine learning models. The processors retrieve and execute the software to drive the operation of platform 500. Compute engine 520 comprises wired (and/or wireless) communication links to the camera 524, gimbal 519, sensors 514, and to external systems. Compute engine 524 generates control signaling for gimbal 519, sensors 514, and camera 524. The control signaling directs gimbal 524 to manipulate the pan, tilt, and roll axes of camera 524 to position the field of view of camera 524 at a desired location. Gimbal 519 and compute engine 520 may form a PID control loop to continually adjust the pan, tilt, and roll axes of camera 524 to counter any positional errors in the field of view of camera 524 (e.g., swaying of mounting structure 531). The control signaling directs camera 524 to generate an infrared video feed of its field of view. The control signaling directs sensors 514 to sense the surrounding environment using its various sensor modalities.

Compute engine 520 receives infrared video generated by camera 524, visible spectrum video generated by sensors 514, and/or other sensor data generated by sensors 514. Compute engine 520 vectorizes the received data and processes the feature vectors using its machine learning models. The machine learning models comprise algorithms trained to detect gas leaks, determine fill levels, and otherwise determine the status of hydrocarbon storage, transfer, and extraction equipment. The machine learning models produce outputs which indicate the status of the monitored equipment (e.g., the presence of a natural gas leak).

Compute engine 520 transfers the outputs to downstream systems. Compute engine 520 may also transfer the raw sensor data to downstream systems for further processing, display, or storage. Compute engine 520 is mounted above air inlet 521. Compute engine 520 comprises air jets to draw air in through inlet 521. The air passes over the processors, memory, and other computing elements of compute engine 520 and exits through outlet 522 to draw heat out of housing 511. Inlet 521 and outlet 522 comprise filters (e.g., filter 523) to inhibit water and dust from entering housing 511. Compute engine 520 may comprise snap-in electrical connections that allow the computing components to be efficiently swapped (e.g., a GPU upgrade). For example, the snap-in connections may comprise Peripheral Component Interconnect Express (PCIe) slots.

Figure 9:
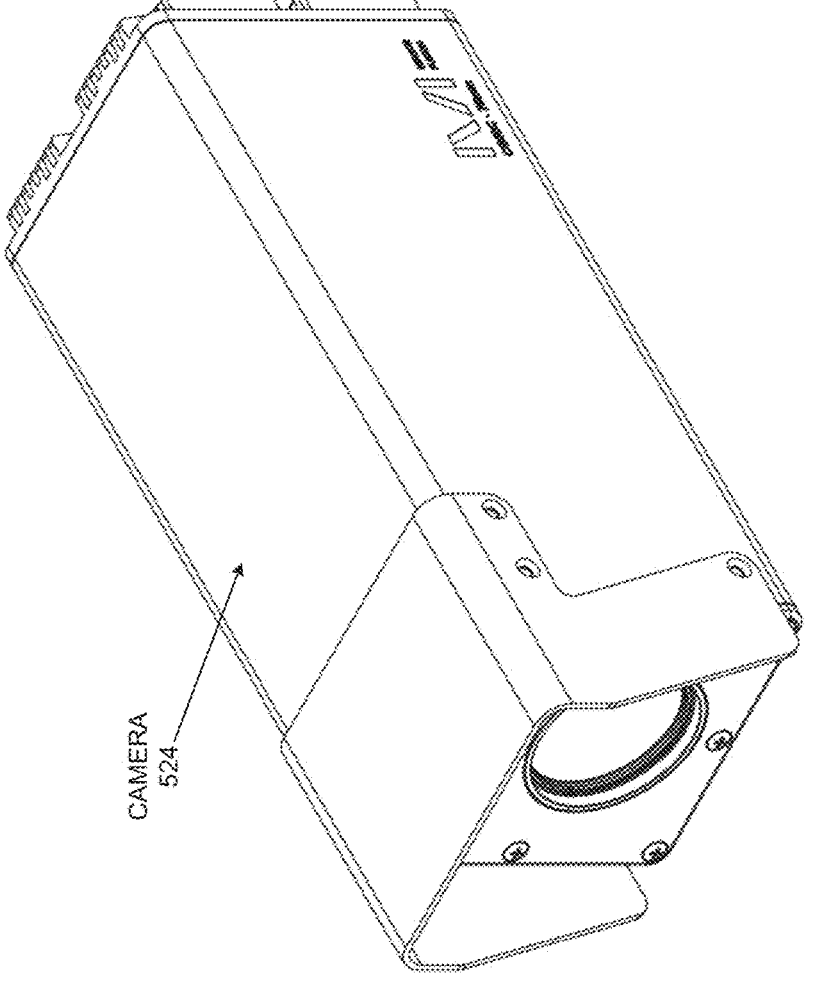
FIG. 9 illustrates an exemplary schematic view of a camera of the sensor platform.
Figure 10:
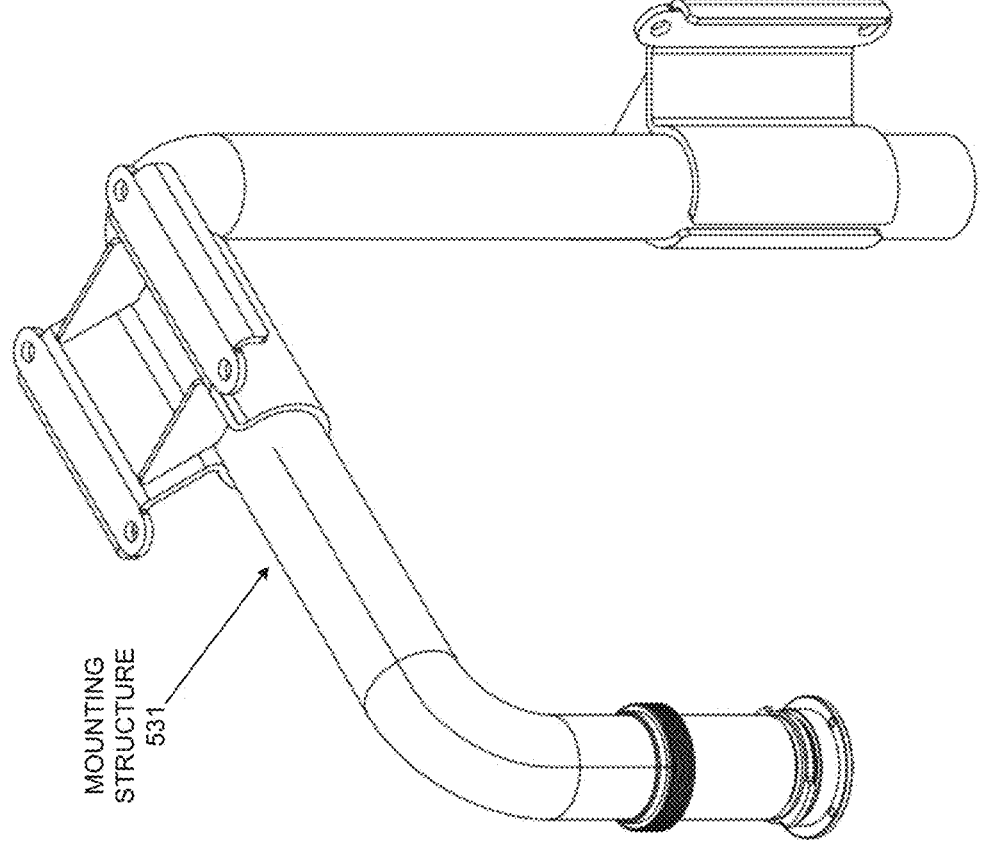
FIG. 10 illustrates an exemplary schematic view of a mounting structure of the sensor platform.

FIG. 9 illustrates a perspective view of camera 524 in sensor platform 500. Camera 524 may comprise an infrared camera, optical camera, or some other type of imaging modality. Camera 524 comprises quick connect attachments to detachably couple to camera mount 517. Camera 524 comprises a metallic housing to shield its internal electronics from the environment. Camera 524 comprises components like lenses, optics, digitization circuitry, video processing circuitry, and the like. Camera 524 generates an infrared video feed of its field of view and provides the video feed to compute engine 520. FIG. 10 illustrates a perspective view of mounting structure 531 in sensor platform 500.

Figure 11:
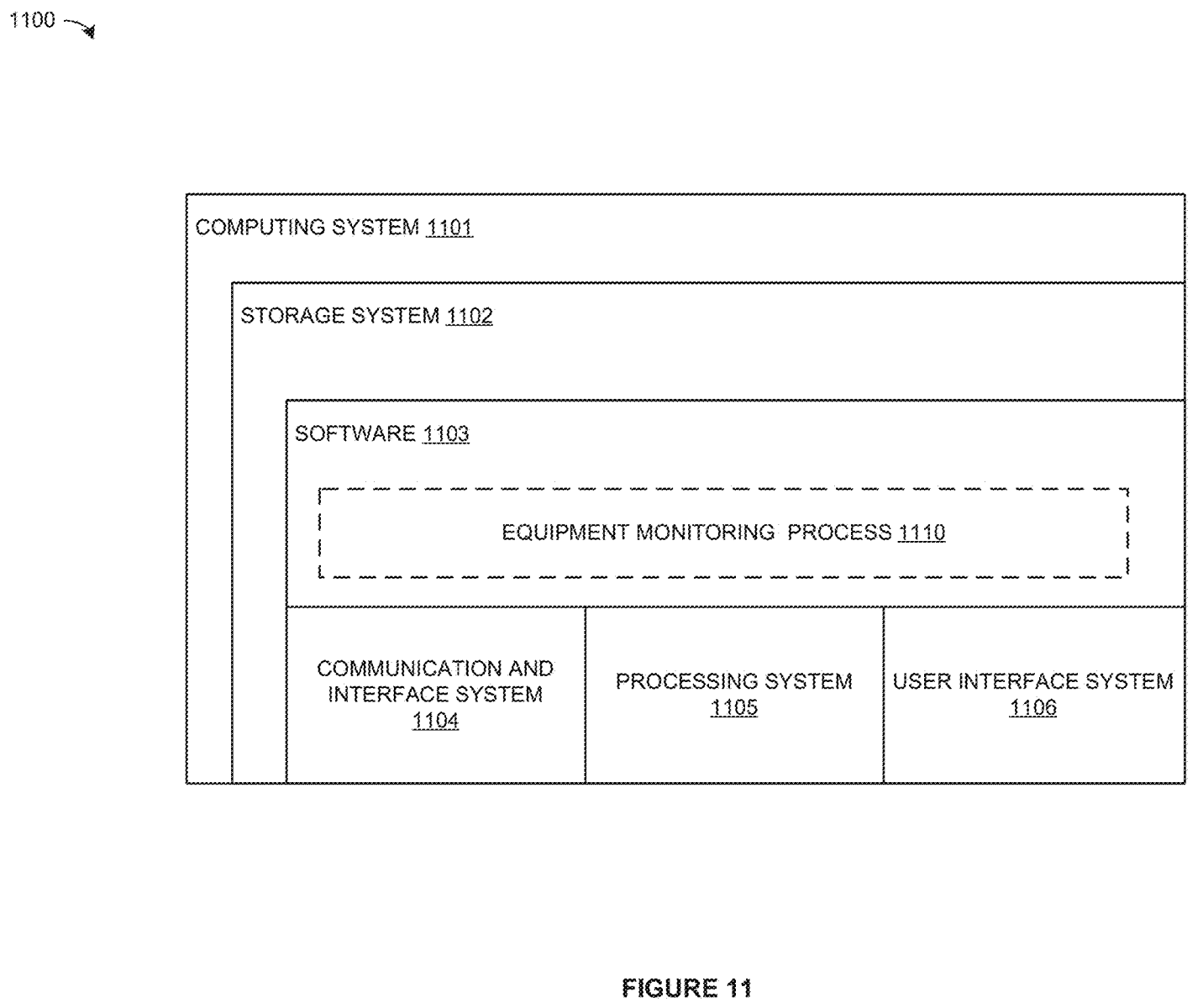

FIG. 11 illustrates computing system 1101. Computing system 1101 is representative of any system or collection of systems with which the various operational architectures, processes, scenarios, and sequences disclosed herein for monitoring equipment in hydrocarbon extraction, transfer, and storage environments. For example, computing system 1101 may be representative of compute engine 140, compute engine 451, compute engine 520, and/or any other computing device contemplated herein. Computing system 1101 may be implemented as a single apparatus, system, or device or may be implemented in a distributed manner as multiple apparatuses, systems, or devices. Computing system 1101 includes, but is not limited to, storage system 1102, software 1103, communication interface system 1104, processing system 1105, and user interface system 1106. Processing system 1105 is operatively coupled with storage system 1102, communication interface system 1104, and user interface system 1106.

Processing system 1105 loads and executes software 1103 from storage system 1102. Software 1103 includes and implements equipment monitoring process 1110, which is representative of any of the hydrocarbon equipment monitoring, control, leak detection, and/or fill level detection processes described with respect to the preceding Figures, including but not limited to the video imaging, machine learning, leak detection and classification, fill level detection and classification, and device control operations described with respect to the preceding Figures. For example, equipment monitoring process 1110 may be representative of process 200 illustrated in FIG. 2 and/or process 300 illustrated in FIG. 3. When executed by processing system 1105 to monitor hydrocarbon storage, extraction, and transfer equipment, software 1103 directs processing system 1105 to operate as described herein for at least the various processes, operational scenarios, and sequences discussed in the foregoing implementations. Computing system 1101 may optionally include additional devices, features, or functionality not discussed for purposes of brevity.

Processing system 1105 may comprise a micro-processor and other circuitry that retrieves and executes software 1103 from storage system 1102. Processing system 1105 may be implemented within a single processing device but may also be distributed across multiple processing devices or subsystems that cooperate in executing program instructions. Examples of processing system 1105 include general purpose CPUs, GPUs, DSPs, ASICs, FPGAs, analog computing devices, and logic devices, as well as any other type of processing device, combinations, or variations thereof.

Storage system 1102 may comprise any computer readable storage media readable by processing system 1105 and capable of storing software 1103. Storage system 1102 may include volatile, nonvolatile, removable, and/or non-removable media implemented in any method or technology for storage of information, such as computer readable instructions, data structures, program modules, or other data. Examples of storage media include RAM, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1102 may also include computer readable communication media over which at least some of software 1103 may be communicated internally or externally. Storage system 1102 may be implemented as a single storage device but may also be implemented across multiple storage devices or sub-systems co-located or distributed relative to each other. Storage system 1102 may comprise additional elements, such as a controller, capable of communicating with processing system 1105 or possibly other systems.

Software 1103 (equipment monitoring process 1110) may be implemented in program instructions and among other functions may, when executed by processing system 1105, direct processing system 1105 to operate as described with respect to the various operational scenarios, sequences, and processes illustrated herein. For example, software 1103 may include program instructions for generating feature vectors that represent a video depicting hydrocarbon storage equipment and generating a machine learning output to identify and classify the status of the storage equipment as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1103 may include additional processes, programs, or components, such as operating system software, virtualization software, or other application software. Software 1103 may also comprise firmware or some other form of machine-readable processing instructions executable by processing system 1105.

In general, software 1103 may, when loaded into processing system 1105 and executed, transform a suitable apparatus, system, or device (of which computing system 1101 is representative) overall from a general-purpose computing system into a special-purpose computing system customized to control an equipment monitoring device and process infrared videos using machine learning algorithms as described herein. Indeed, encoding software 1103 on storage system 1102 may transform the physical structure of storage system 1102. The specific transformation of the physical structure may depend on various factors in different implementations of this description. Examples of such factors may include, but are not limited to, the technology used to implement the storage media of storage system 1102 and whether the computer-storage media are characterized as primary or secondary storage, as well as other factors.

For example, if the computer readable storage media are implemented as semiconductor-based memory, software 1103 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1104 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1101 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and an extended discussion of them is omitted for the sake of brevity.

While some examples provided herein are described in the context of computing devices for device control and equipment monitoring, it should be understood that the equipment monitoring systems and methods described herein are not limited to such embodiments and may apply to a variety of other environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A detection system to monitor a hydrocarbon storage environment, the detection system comprising:
   a compute engine;
   a gimbal communicatively coupled to the compute engine;
   a sensor suite communicatively coupled to the compute engine;
   an imaging system communicatively coupled to the compute engine and operatively coupled to the gimbal;
   a housing that mounts the compute engine, the gimbal, the sensor suite, and the imaging system, wherein the sensor suite is internally mounted to the housing and detachably coupled to the housing via a quick connect socket;
   the compute engine configured to:
      receive a command to view a piece of hydrocarbon storage equipment;
      generate control signaling that directs the gimbal to orient the imaging system and transfer the control signaling to the gimbal to orient the imaging system to view the piece of hydrocarbon storage equipment;
      generate image signaling that directs the imaging system to image the hydrocarbon storage equipment and transfer the image signaling to the imaging system; and
      generate sensor signaling that directs the sensor suite to sense the hydrocarbon storage equipment and transfer the sensor signaling to the sensor suite;
   the gimbal configured to receive the control signaling and orient the imaging system to view the piece of hydrocarbon storage equipment based on the control signaling;
   the imaging system configured to receive the image signaling, image the hydrocarbon storage equipment, and transfer image data that depicts the hydrocarbon storage equipment to the compute engine;

the sensor suite configured to receive the sensor signaling, sense the hydrocarbon storage equipment, and transfer sensor data that characterizes the hydrocarbon storage equipment to the compute engine; and the compute engine configured to receive the image data and the sensor data, process the image data and the sensor data with a machine learning algorithm trained to determine a status of the hydrocarbon storage equipment, and transfer a machine learning output that indicates the status of the hydrocarbon storage equipment to a downstream system.

2. The detection system of claim 1 wherein the housing comprises at least one of an aluminum frame, a steel frame, or a plastic frame.

3. The detection system of claim 1 wherein the compute engine and the gimbal are mounted internally on the housing and the imaging system is mounted externally on the housing.

4. The detection system of claim 3 wherein the imaging system and the compute engine are detachably coupled to the housing.

5. The detection system of claim 4, wherein the imaging system comprises a quick connect attachment to detachably couple to the housing.

6. The detection system of claim 5 wherein the housing is detachably coupled to a mounting structure that mounts the housing at an elevation.

7. The detection system of claim 1 wherein the imaging system comprises an infrared video camera.

8. The detection system of claim 1 wherein the sensor suite comprises a visible spectrum video camera and a rangefinder.

9. The detection system of claim 1 wherein the gimbal comprises one or more actuators and rotors to adjust one or more of roll, yaw, or tilt of the imaging system.

10. The detection system of claim 1 wherein:

the machine learning is trained to detect leaks in the hydrocarbon storage equipment based on the image data and sensor data; and the machine learning output comprises data that indicates when the hydrocarbon storage equipment comprises a leak.

11. The detection system of claim 1 wherein:

the machine learning is trained to measure fill levels in the hydrocarbon storage equipment based on the image data and sensor data; and the machine learning output comprises data that indicates the fill level of the hydrocarbon storage equipment.

12. The detection system of claim 1 further comprising a cooling system to regulate the temperature of the compute engine.

13. The detection system of claim 12 wherein the cooling system comprises an air jet, an air channel, an inlet filter, and an outlet filter.

14. The detection system of claim 13 wherein the inlet filter and the outlet filter are permeable to air and impermeable to liquid and particulate matter.

15. The detection system of claim 13 wherein the inlet filter and the outlet filter are permeable to air and semipermeable to liquid and particulate matter.

16. The detection system of claim 1 wherein the image data comprises infrared video footage that depicts the hydrocarbon storage equipment.

17. The detection system of claim 1 wherein the sensor data comprises visible spectrum video footage and a distance between the hydrocarbon storage equipment and the detection system.

18. A method of operating a detection system to monitor a hydrocarbon storage environment, the method comprising:

mounting a thermal imaging system and a sensor suite, wherein the thermal imaging system is externally coupled to the detection system via a gimbal and the sensor suite is internally mounted to the detection system via a quick connect socket;

orienting a thermal imaging system to view hydrocarbon storage equipment;

generating thermal image data depicting the hydrocarbon storage equipment;

generating sensor data that characterizes the hydrocarbon storage equipment;

processing the thermal imaging data and the sensor data using a machine learning algorithm trained to identify a status of the hydrocarbon storage equipment and responsively generating a machine learning output; and transferring the machine learning output to downstream systems.

19. The method of claim 18 further comprising:

vectorizing the thermal imaging data to generate numeric representations of the thermal imaging data; and wherein:

processing the thermal imaging data using the machine learning algorithm comprises processing the numeric representations of the thermal imaging data; and responsively generating the machine learning output comprises generating the machine learning output that indicates when the hydrocarbon storage equipment comprises a leak.

20. A non-transitory computer-readable medium stored thereon instructions to monitor a hydrocarbon storage environment using a detection system, that, in response to execution, cause a system comprising a processor to perform operations, the operations comprising:

orienting a thermal imaging system externally mounted to the detection system via a gimbal to view a piece of hydrocarbon storage equipment;

directing the thermal imaging system to generate thermal image data depicting the hydrocarbon storage equipment;

directing a sensor suite to generate sensor data that characterizes the hydrocarbon storage equipment, wherein the sensor suite is internally mounted to the detection system via a quick connect socket;

obtaining the thermal image data depicting the hydrocarbon storage equipment generated by the thermal imaging system and obtaining the sensor data generated by the sensor suite;

processing the thermal imaging data and the sensor data using a machine learning algorithm trained to identify the status of the hydrocarbon storage equipment and responsively generating a machine learning output; and transferring the machine learning output to downstream systems.

* * * * *